(12) United States Patent
Lawrance et al.

(10) Patent No.: US 7,082,551 B2
(45) Date of Patent: Jul. 25, 2006

(54) METHOD AND DATA PROCESSING SYSTEM PROVIDING CHECKPOINT/RESTART ACROSS MULTIPLE HETEROGENEOUS COMPUTER SYSTEMS

(75) Inventors: William Lawrance, Phoenix, AZ (US); Howard Hagan, Glendale, AZ (US); David S. Edwards, Phoenix, AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 691 days.

(21) Appl. No.: 09/896,700

(22) Filed: Jun. 29, 2001

(65) Prior Publication Data

US 2003/0140272 A1    Jul. 24, 2003

(51) Int. Cl.
*G06F 11/08* (2006.01)
(52) U.S. Cl. .................... 714/13; 714/19; 714/20; 714/35; 714/38
(58) Field of Classification Search ............... 714/13, 714/35, 38, 17, 20
See application file for complete search history.

(56) References Cited

U.S. PATENT DOCUMENTS

| | | | | | |
|---|---|---|---|---|---|
| 5,745,730 | A | * | 4/1998 | Nozue et al. | 711/135 |
| 5,802,267 | A | * | 9/1998 | Shirakihara et al. | 714/15 |
| 5,907,678 | A | * | 5/1999 | Housel et al. | 709/213 |
| 6,442,663 | B1 | * | 8/2002 | Sun et al. | 711/202 |
| 6,594,779 | B1 | * | 7/2003 | Chandra et al. | 714/15 |
| 2002/0152271 | A1 | * | 10/2002 | Chafle et al. | 709/204 |
| 2002/0174379 | A1 | * | 11/2002 | Korenevsky et al. | 714/19 |

* cited by examiner

*Primary Examiner*—Robert Beausoliel
*Assistant Examiner*—Joseph D Manoskey
(74) *Attorney, Agent, or Firm*—Bruce E. Hayden; James H. Phillips; Faith F. Driscoll

(57) ABSTRACT

Bulk data is read or written by an application on a first computer system to a file on a second heterogeneous computer system. Alternatively it is read or written as bulk data directly between applications on these heterogeneous systems. Jobs or tasks are started from one system to execute on a second heterogeneous system. Results are then returned to the first system. Checkpointing and later restarting is also initiated from a first system for execution on the second heterogeneous system.

4 Claims, 7 Drawing Sheets

METHOD AND DATA PROCESSING SYSTEM PROVIDING CHECKPOINT/RESTART ACROSS MULTIPLE HETEROGENEOUS COMPUTER SYSTEMS

CROSS REFERENCE TO RELATED APPLICATION

This application is related to our patent application entitled "METHOD AND DATA PROCESSING SYSTEM PROVIDING FILE I/O ACROSS MULTIPLE HETEROGENEOUS COMPUTER SYSTEMS", filed of even date herewith and assigned to the assignee hereof.

This application is related to our copending patent application entitled "METHOD AND DATA PROCESSING SYSTEM PROVIDING REMOTE PROGRAM INITIATION AND CONTROL ACROSS MULTIPLE HETEROGENEOUS COMPUTER SYSTEMS", filed of even date herewith and assigned to assignee hereof.

This application is related to our patent application entitled "METHOD AND DATA PROCESSING SYSTEM PROVIDING BULK RECORD MEMORY TRANSFERS ACROSS MULTIPLE HETEROGENEOUS COMPUTER SYSTEMS", filed on even date herewith and assigned to the assignee hereof, which issued as U.S. Pat. No. 6,615,217 on Sep. 2, 2003.

This application is related to our copending patent application entitled "METHOD AND DATA PROCESSING SYSTEM PROVIDING DATA CONVERSION ACROSS MULTIPLE HETEROGENEOUS COMPUTER SYSTEMS", filed of even date herewith and assigned to the assignee hereof.

FIELD OF THE INVENTION

The present invention generally relates to interconnected heterogeneous data processing systems, and more specifically to reading and writing files by an application on a first system to a disk on a heterogeneous second system.

BACKGROUND OF THE INVENTION

FIG. 1 is a block diagram illustrating a General Purpose Computer 20 in a data processing system. The General Purpose Computer 20 has a Computer Processor 22, and Memory 24, connected by a Bus 26. Memory 24 is a relatively high speed machine readable medium and includes Volatile Memories such as DRAM, and SRAM, and Non-Volatile Memories such as, ROM, FLASH, EPROM, and EEPROM. Also connected to the Bus are Secondary Storage 30, External Storage 32, output devices such as a monitor 34, input devices such as a keyboard 36 (with mouse 37), and printers 38. Secondary Storage 30 includes machine-readable media such as hard disk drives (or DASD) and disk sub-systems. External Storage 32 includes machine-readable media such as floppy disks, removable hard drives, magnetic tapes, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such as data base management software, operating systems, and user programs can be stored in a Computer Software Storage Medium such as memory 24, Secondary Storage 30, and External Storage 32. Executable versions of computer software 33, can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

FIG. 2 is a block diagram illustrating file reading and writing across heterogeneous systems, in accordance with the Prior Art. In a first computer system 110, an application 120 writes records to a file 114. When the application 120 completes writing to the file 114, the file 114 is closed. Then, a utility, such as FTP, is utilized to transfer the file 114 to a second computer system 112, where a corresponding utility 124 writes the file 116 on disk on that second computer system 112. A second application 126 can then read and process the second file 116. Any necessary translations between the two heterogeneous computer systems is performed by the two utility programs 122, 124.

In the preferred embodiment of this invention, the first computer system 110 is a GCOS® 8 mainframe system that operates utilizing 36-bit words with either 4 9-bit or 6 6-bit characters per word. The preferred second computer system 112 is a UNIX system utilizing 8-bit bytes. The preferred UNIX variant is IBM's AIX. One application that is commonly utilized here is the dumping of a database on the GCOS 8 system 110 to a "flat" file 114. The "flat" file is then moved as bulk data to a Teradata system 112 from NCR, where the "flat" file 114 is loaded into a second database utilizing a "FastLoad" program 126 from NCR.

There are a number of problems with this implementation. Most notably, it is necessary to write the data twice, once on each system, and read it twice, again, once on each system. In large systems, this overhead can be substantial.

FIG. 3 is a block diagram illustrating writing of a file 116 on a second computer system 112 by an application 130 executing on a first computer system 110. The file 116 can then be read and processed by an application 136 on the second computer system 112.

This functionality is available in some homogeneous computer systems. For example, the Solaris operating system sold by Sun provides a Remote File System functionality that allows an application on a first computer system 110 to write files 116 on a second computer system 112. Microsoft Windows (various levels) also supports similar functionality.

However, this functionality has been limited in the prior art to homogeneous computer systems such as Solaris or Windows. It has not been available between heterogeneous computer systems. There are a number of reasons for this. One reason that this functionality has been limited in prior art systems to homogeneous computer systems is that in such cases, there is no requirement to perform any translation between systems, such as between 9 and 8 bit bytes as required in the preferred embodiment of this invention.

FIG. 4 is a block diagram illustrating transferring data directly between an application 130 on a first computer system 110 to a second application 136 on a second computer system 112. This is currently available between applications on heterogeneous computer systems as message passing. One example of a message passing mechanism between heterogeneous computer systems is the FlowBus product sold by the assignee of this invention. However, in the prior art, this is typically fairly slow and expensive due to the requirement to acknowledge messages. It would thus be advantageous to provide this functionality between heterogeneous computer systems utilizing more efficient protocols. In particular, it would be advantageous to provide this functionality for bulk data transfers.

Another problem encountered when utilizing heterogeneous computer systems is that of synchronizing jobs executing on the two computer systems 110, 112. Many variants of UNIX provide the capability to start jobs or tasks on other UNIX systems, to wait for results from the execution of those jobs or tasks, and to receive and act upon those results. However, this capability has not been available in the prior art between heterogeneous computer systems. Some of the problems that have prevented this in the prior art are different formats of data on the two systems, different methods of starting jobs or tasks, and different methods of returning job or task status information. It would thus be advantageous to be able to execute jobs or tasks on a second computer system 112 started from a first heterogeneous computer system 110, which then receives the results of that execution when the jobs or tasks complete.

Another problem encountered when utilizing heterogeneous computer systems is that of checkpointing and restarting jobs or tasks operating on. Again, this feature has been present to some extent when operating across multiple homogeneous computer systems, but not across multiple heterogeneous computer systems. Part of the reason for this problem is that each computer architecture involved utilizes its own unique methods of checkpointing and restarting jobs or tasks. It would thus be advantageous to be able to order checkpointing on a second computer system 112 from a first heterogeneous computer system 110, and then later optionally restarting the checkpointed job or task on that second computer system 112.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which:

FIGS. 12–68 are tables referred to herein.

DETAILED DESCRIPTION

Figure 1:
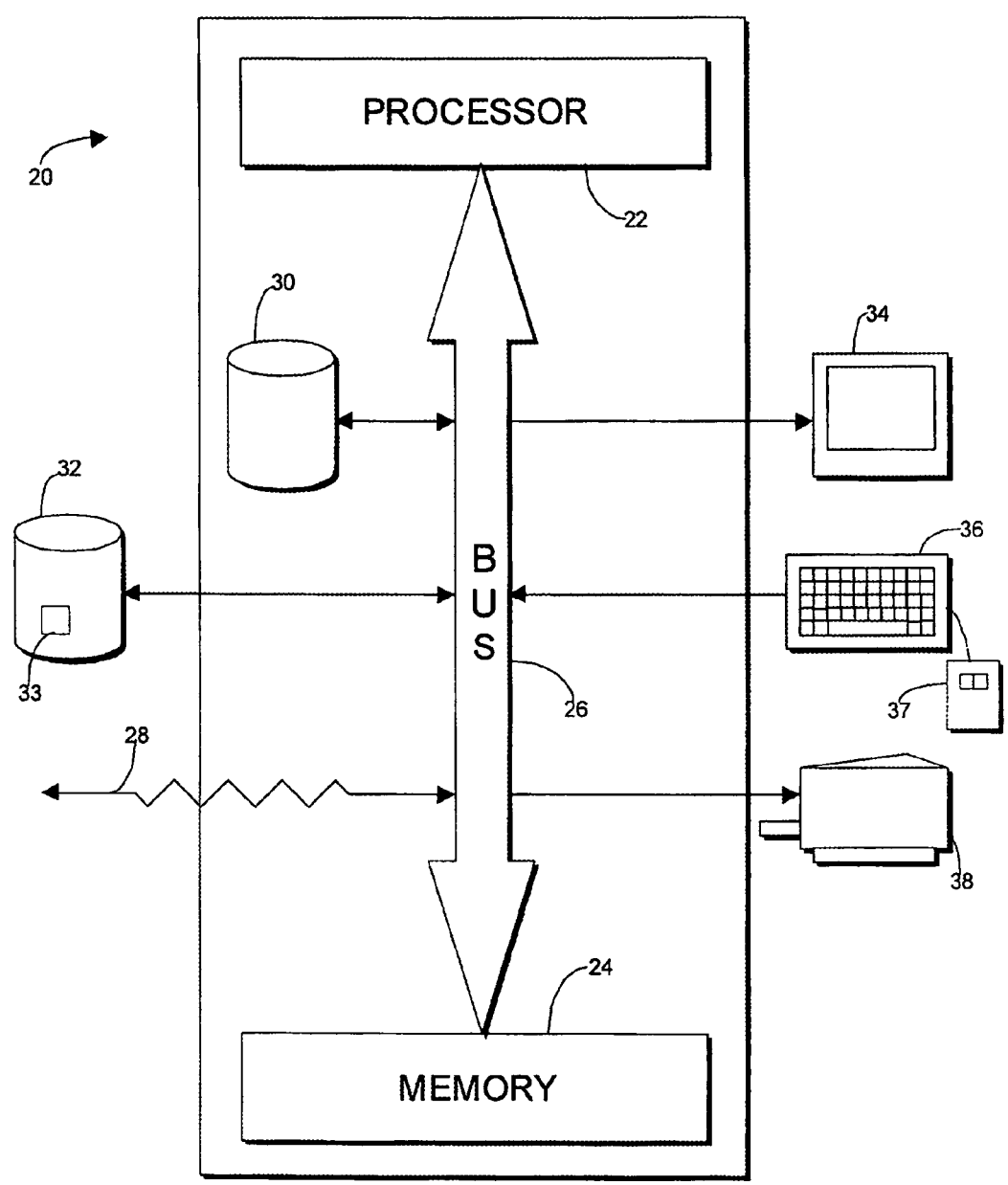
FIG. 1 is a block diagram illustrating a General Purpose Computer in a data processing system.
Figure 2:
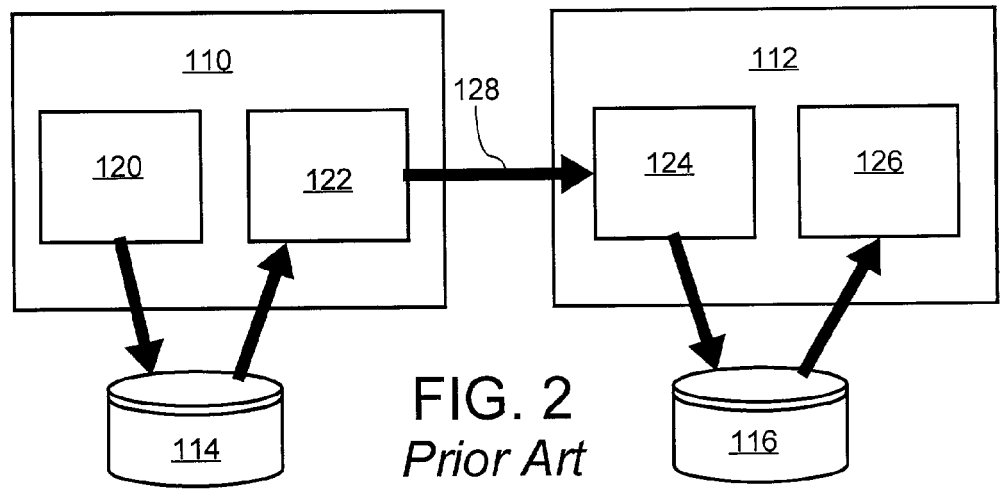
FIG. 2 is a block diagram illustrating file reading and writing across heterogeneous systems, in accordance with the Prior Art.

Bulk data is read or written by an application on a first computer system to a file on a second heterogeneous computer system. Alternatively it is read or written as bulk data directly between applications on these heterogeneous systems. Jobs or tasks are started from one system to execute on a second heterogeneous system, Results are then returned to the first system. Checkpointing and later restarting is also initiated from a first system for execution on the second heterogeneous system.

Returning to FIG. 3, functionality is described hereinbelow that allows an application 130 on a first computer system 110 to read data from or write data to a file 116 on a second heterogeneous computer system 112. The data is read and/or written as bulk data, in a similar manner as provided by typical file read and writes. An application 136 on the second computer system 112 can then read or write the file 116. The two computer systems 110, 112, may be coupled 132 by a direct channel connection, such as SCSI or Fiber Channel. Alternatively, the two systems may be coupled utilizing communications links and a communications protocol such as TCP/IP. Finally (not shown), the two computer systems 110, 112, may share memory and utilize message passing between the two computer systems 110, 112 for this transfer.

In the preferred embodiment, a program 130 in the first computer system 110 opens one or more files 116 on the second heterogeneous computer system 112. The program 130 then writes to and/or reads from these files 116.

Figure 3:
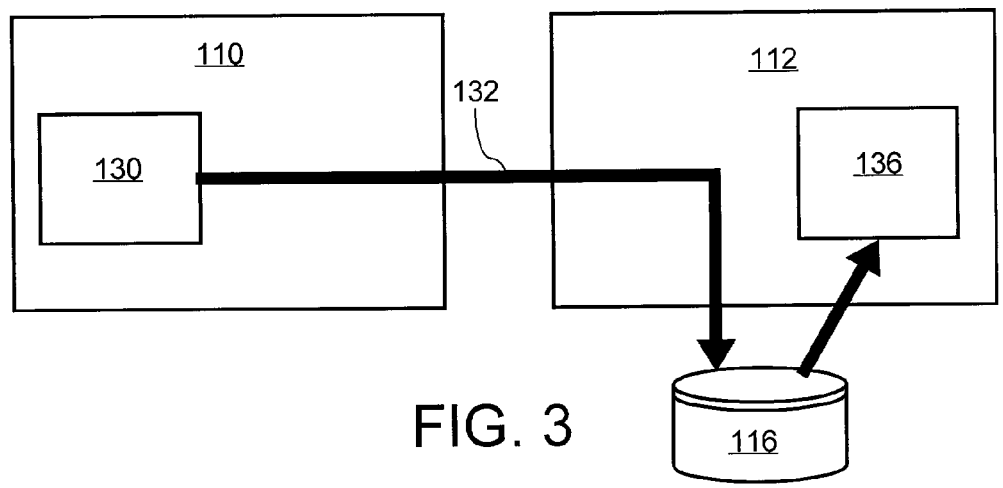
FIG. 3 is a block diagram illustrating writing of a file on a second computer system by an application executing on a first computer system.
Figure 5:
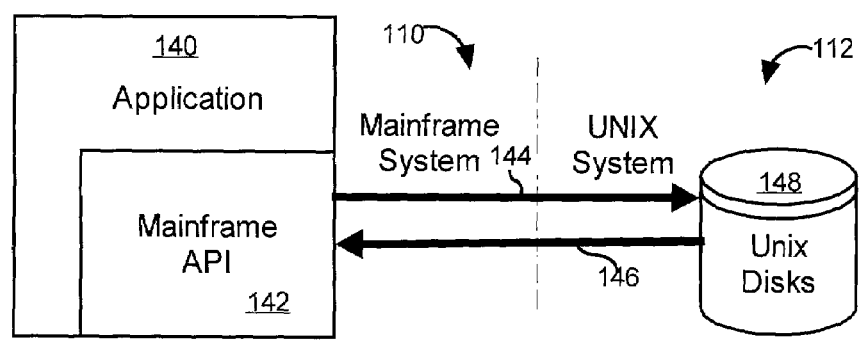
FIG. 5 is a block diagram that illustrates in further detail the systems shown in FIG. 3, in accordance with a preferred embodiment of the present invention.

FIG. 5 is a block diagram that illustrates in further detail the systems shown in FIG. 3, in accordance with a preferred embodiment of the present invention. An application 140 executing on the first (mainframe) computer system 110 makes function calls to an Applications Programming Interface (API) 142. Data is written by or read from that API 142 from/to the application 140. The data is then transmitted to 144 or received from 146 the second (UNIX) system 112, where it is written to or read from disk drive(s) 148 on that second system 112.

This provides an efficient mechanism for bulk transfer data from one computer system 110 to files on another heterogeneous computer system 112.

Figure 4:
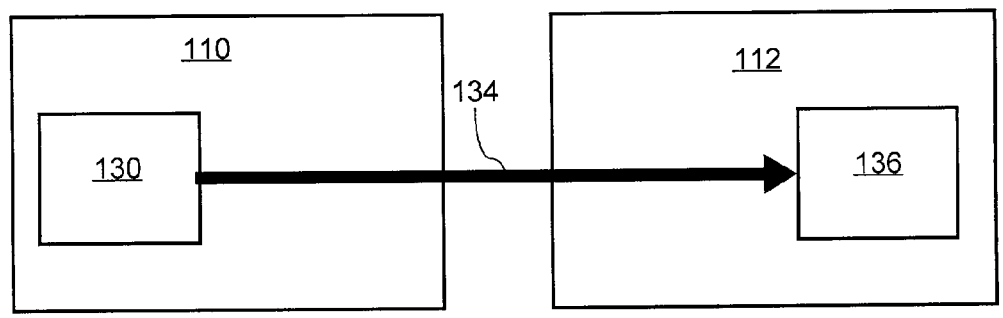
FIG. 4 is a block diagram illustrating transferring data directly between an application on a first computer system to a second application on a second computer system.

Returning to FIG. 4, functionality is described hereinbelow that allows an application 130 on a first computer system 110 to read data from or write data directly to an application 136 on a second heterogeneous computer system 112. The data is read and/or written as bulk data, in a similar manner as provided by typical file read and writes. When the second computer system 112 is a UNIX system, the application 136 reading or writing the bulk data typically does so utilizing UNIX pipes. These can be coupled (by standard UNIX command language) to 'stdin' and 'stdout'. The two computer systems 110, 112, may be coupled 132 by a direct channel connection, such as SCSI or Fiber Channel. Alternatively, the two coupled utilizing communications links and a communications protocol such as TCP/IP. Finally (not shown), the two computer systems 110, 112, may share memory and utilize message passing between the two computer systems 110, 112 for this transfer.

In the preferred embodiment, a first program 130 in the first computer system 110 starts execution of one or more programs 136 on the second heterogeneous computer system 112. A first pipe is coupled to 'stdin' on each started program 136, and a second pipe is coupled to 'stdout' and 'stderr' on each such started program 136. Then, using the same file read and write interfaces used for remotely reading and writing files in FIG. 3, the first program 130 writes bulk record data that is read by the started program 136 via its 'stdin' file, and reads bulk record data that has been written by the started program 136 on its 'stdout' and 'stderr' files. The two programs 130, 136 receive end-of-file notifications from each other when so indicated. Finally, the started program 136 provides a result or error code and optionally an error string to the first program 130 upon completing.

Note that when the second computer system 112 is a UNIX system, all of the standard UNIX utilities are available for remote execution in this manner. Also, as is typical in UNIX, multiple UNIX utilities can be concatenated together using pipes. The first program 130 would thus provide input to the first UNIX program, and receive output from the last in the piped chain. Finally note that a single program 130 on the first system 110 may have multiple files open on the second system 112, as well as pipe connections to multiple started programs on that second system. The same interface is utilized for reading and writing all of such.

Figure 6:
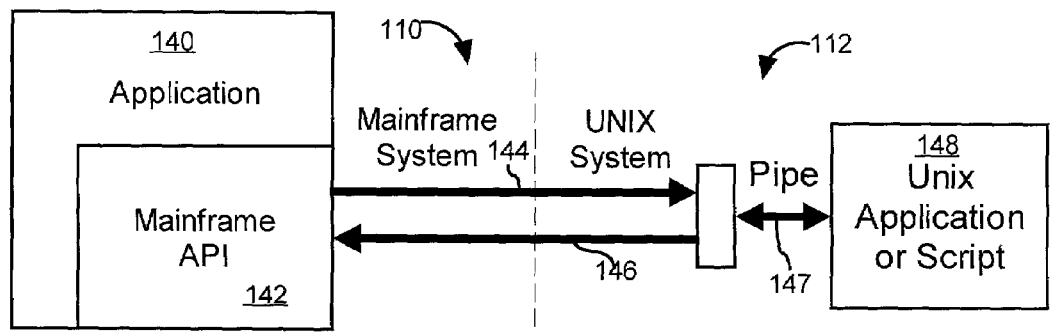
FIG. 6 is a block diagram that illustrates in further detail the systems shown in FIG. 5, in accordance with a preferred embodiment of the present invention.

FIG. 6 is a block diagram that illustrates in further detail the systems shown in FIG. 5, in accordance with a preferred embodiment of the present invention. An application 140 executing on the first (mainframe) computer system 110 makes function calls to an Applications Programming Interface (API) 142, Data is written by or read from that APT 142 from/to the application 140. The data is then transmitted to 144 or received from 146 the second (UNIX) system 112, where it is written to or read from a pipe 147 on that second system 112, where it is read from or written by an application or script 148 on that second system 112.

This provides a mechanism to efficiently transmit bulk record data to/from an application 130 executing on a first computer system 110 from/to an application 136 executing on a second heterogeneous computer system 112.

Figure 7:
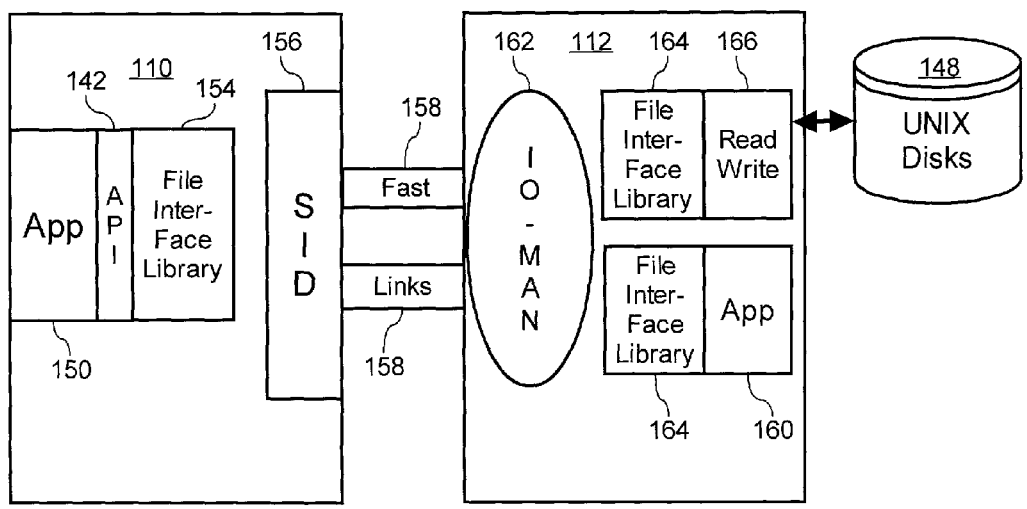
FIG. 7 is a block diagram illustrating in further detail a channel connected implementation of a preferred embodiment of the present invention.

FIG. 7 is a block diagram illustrating in further detail a channel connected implementation of a preferred embodiment of the present invention. An application 150 on the first (mainframe) computer system 110 is coupled to and communicates with an API 142. The API 142 in turn communicates with a File Interface Library 154. The File Interface Library 154 communicates with a Server Interface Domain (SID) 156. The SID 156 communicates over "Fast Links" 158 such as SCSI or Fiber Channel, to an IO-Manager (IO-MAN) 162 on the second, heterogeneous (UNIX) computer system 112. IO-MAN 162 communicates with a File Interface Library 164 on that system, which in turn either communicates with a File Read/Write utility (UFAP) 166 or via an API (not shown) or via "stdin" with an application 160 on that computer system 112. The File Read/Write utility 166 writes to or reads from a disk(s) on that computer system 112.

Figure 8:
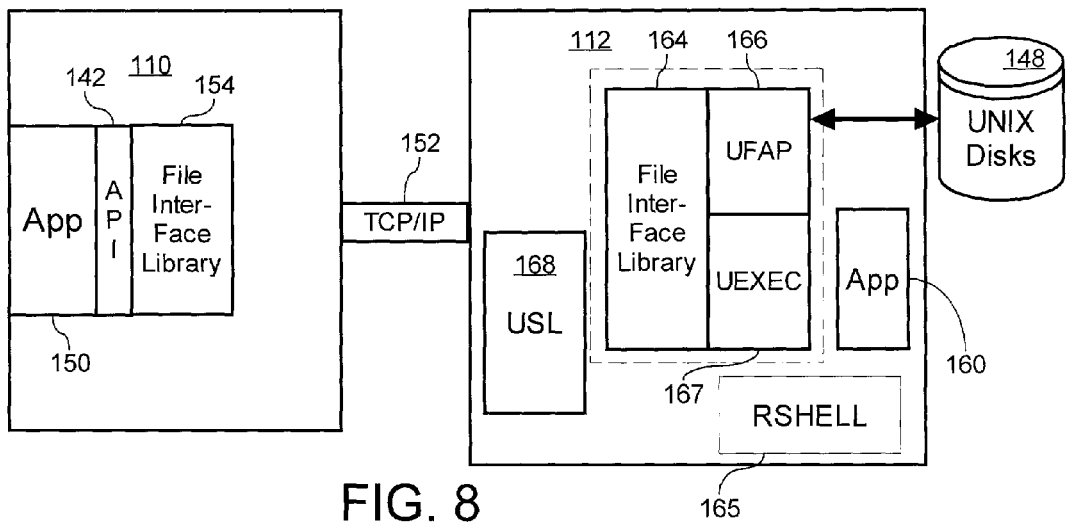
FIG. 8 is a block diagram illustrating in further detail a communications link connected implementation of a preferred embodiment of the present invention.

FIG. 8 is a block diagram illustrating in further detail a communications link connected implementation of a preferred embodiment of the present invention. An application 150 on the first (mainframe) computer system 110 is coupled to and communicates with an APT 142. The API 142 in turn communicates with a File Interface Library 154. The File Interface Library 154 communicates over a communications link 152 utilizing a communications protocol such as TCP/IP with the second, heterogeneous (UNIX) computer system 112. Receiving communications calls on the second computer system 112 is a UNIX Sockets Listener (USL) 168. The USL 168 in turn either communicates with a File Read/Write utility (UFAP) 166 or via an API (not shown) with an application 160 on that computer system 112. The File Read/Write utility 166 writes to or reads from a disk(s) on that computer system 112.

Figure 9:
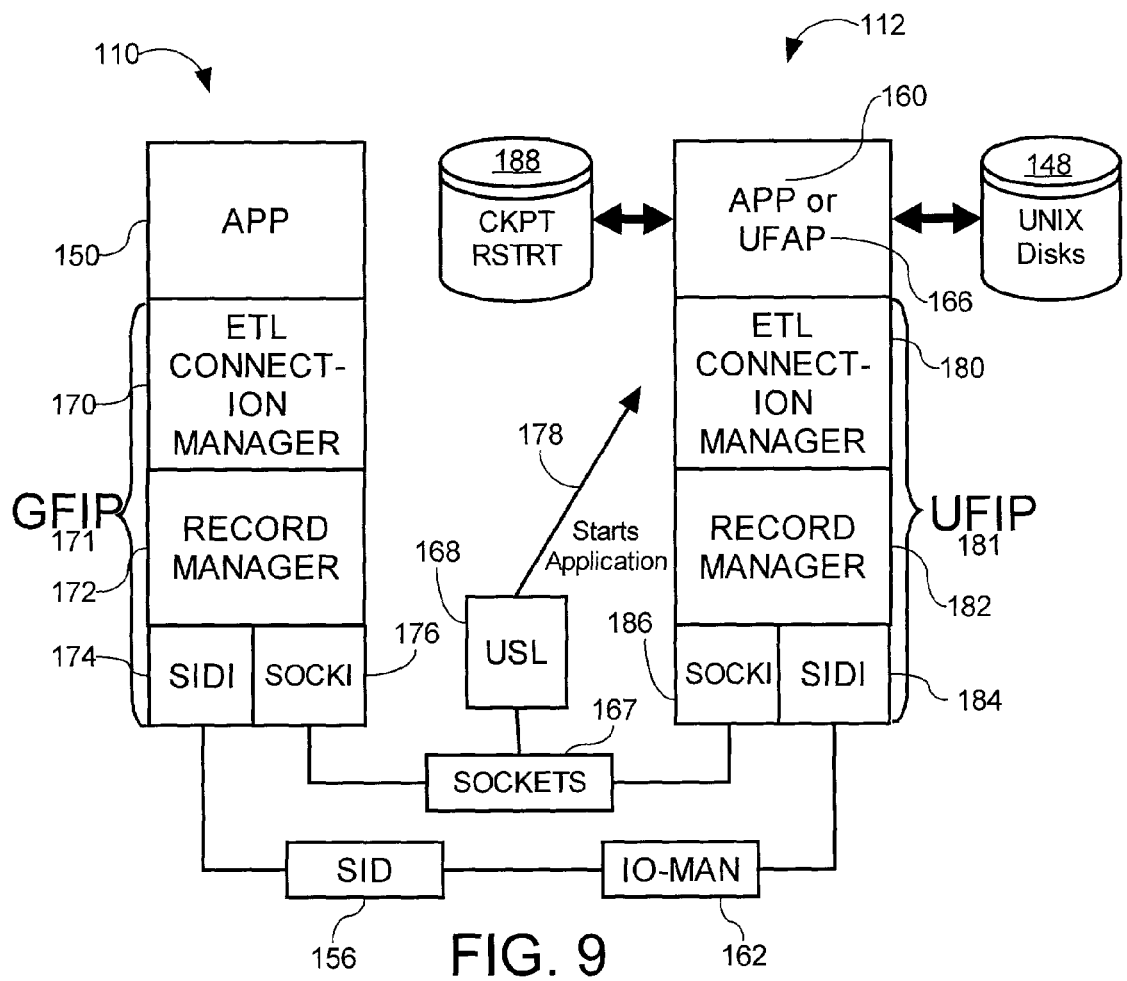
FIG. 9 is a block diagram that illustrates in further detail the modules utilized in a preferred embodiment of the present invention.

FIG. 9 is a block diagram that illustrates in farther detail the modules utilized in a preferred embodiment of the present invention. For the most part, the modules utilized in both heterogeneous computer systems are equivalent, and will be discussed together here. They are discussed more thoroughly below. An application 150 on the first system 110 communicates with a GCOS File interface Procedure (GFIP) 171. An application 160 and/or the Unix File Read/Write Application (UFAP) 166 on the second system 112 communicates with a UNIX File Interface Procedure (UFIP) 181. Both the GFIP 171 and the UFIP 181 are comprised of an ETL Connection Manager (ECM) 170, 180 which communicate with a Record Manager 172, 182, which in turn either communicate with a SID Interface (SIDI) 174, 184, in the case of a "Fast Link" 158, or a Sockets Interface (SOCKI) 176, 186, in the case of a communications link 152. In the case of a "Fast Link" 158, the SIDI 174 on the first (mainframe) system 110 communicates with the SID 156, which in turn communicates over the "Fast Link" 158 with the IO-MAN 162 on the second system, which in turn communicates with the SIDI 184 on the second system 112. In the case of a communications link 152, the SOCKI 176 routine(s) on the first system 110 communicate with the sockets interface 167, which in turn communicates with the SOCKI routine(s) 186 on the second system 112. The sockets interface 167 also communicates with a UNIX Sockets Listener (USL) 168 which is a UNIX daemon that starts 178 application programs on UNIX 112 when requested to by GCOS 110 clients. The application 160 and/or UFAP 166 on the second system 112 read and write application files on disks 148 on that second system as well as checkpoint/restart files 188 on that system in response to commands received from the first (GCOS) system 110.

The USL 168 starts and monitors jobs or tasks on the second system 112 upon command from the first system 110. Results of the execution of those jobs or tasks are returned to the first system 110. This allows applications 150 on that first system 110 to control execution of applications 160 on the second system 112 in a similar way as applications are controlled in a single system. In the preferred embodiment, both an error code and/or an error message is returned to the application 150 on the first system 110 if the application 160 on the second system 112 fails to execute properly. Testing of the error return can allow the application 150 to determine whether subsequent steps of its execution should be eliminated because of the failure of application 160 to complete its task.

In the case of checkpoint/restart, typically the application 150 on the first system 110 will perform a checkpoint itself and issue a command that the application 160 on the second system 112 also perform a checkpoint. In the case of a UNIX system, this will typically consist of a "flush" followed by recording the position of the file being written or read. Then, if it is necessary to restart the applications 150, 160, the first application 150 with restart itself and rolling back as appropriate and command its peer application 160 to roll back as required. The information from the previous checkpoint needed to synchronize both applications 150, 160 is saved in a restart file 188 on the second system 112.

Another improvement has been made to the prior art. The application 130 on the first computer system 110 can specify what data conversions are to be performed by the interface between systems. Since the data transfers between systems is typically on a (blocked) record basis, this data conversion can be selected on a per field basis, and is performed on each selected field in each record transferred. Thus, some fields can be converted automatically from 36-bit integers to 32 bit integers (and potentially reversing the "endian" for the integers at the same time), while other fields can be converted from 9-bit ASCII to 8-bit ASCII.

In the preferred embodiment, a "Data Transform Request (DTR) File" (see Appendix A for format of this file) is a parameter to an X_ETL_DEFINEREC API function call and specifies the conversions that are to be performed. In alternate embodiments, this information is specified by other means, such as by Cobol record formats or a database schema or subschema. Also, in other embodiments, this information can be provided in memory instead of as a file. In the preferred embodiment, this conversion is performed on the first system. However, in other embodiments, this conversion can be performed on the second (UNIX) system.

The preferred embodiment of the present invention consists of a GCOS 8 mainframe computer system as the first computer system 110, and an AIX UNIX computer system as the second computer system 112. It should be understood that this is illustrative only, and that the present invention includes other heterogeneous computer systems.

The remainder of this document describes the design of a product ("Fast ETL") that allows GCOS 8 applications to send a stream of bulk data to a UNIX system connected via normal TCP/IP communication links. GCOS 8 applications are provided with an API that can be accessed via Cobol 85. This API allows data to be streamed both to and from GCOS 8. The same API also allows GCOS 8 applications to stream data to or from a DBSP via its SCSI links. This API allows a GCOS application to open multiple files on a UNIX system. It also allows the GCOS application to start multiple programs on the UNIX system. UNIX pipes are connected to 'stdin', 'stdout', and 'stderr' for each started program. The GCOS application can then read and/or write these UNIX files and pipes interchangeably.

The Fast-ETL system described more fully below is constructed in part utilizing existing Data Base Server Processor (DBSP) code currently being sold by assignee of this invention. More extensive documentation for this product, including documentation for any modules not fully discussed below, is commercially available from assignee upon request. However, this added documentation is not required by persons of ordinary skill in this area of expertise to implement this invention.

1 Overview 1.1 Purpose

This document describes a Fast-ETL system. It discloses a system that allows a mainframe (such as GCOS® 8 sold commercially by the assignee of this invention) applications to send a stream of data to a UNIX system connected via normal TCP/IP communication links. It provides that the system provides an API that is accessible via Cobol 85, and that mainframe applications also be allowed to receive a stream of data. Furthermore, this disclosure provides the same data transmission capability with a DBSP via SCSI links.

The UNIX application that is streaming data with the mainframe (GCOS) application may be either a standard UNIX command, a user-written application, or an application provided with the Fast-ETL product. Assignee's application either reads or writes a UNIX file of standard UNIX file format, thereby allowing the mainframe application to either read or write a standard UNIX file. In the other cases, the Fast-ETL system provides a standard UNIX command or the application with a data stream through the UNIX 'stdin' and 'stdout' file descriptors.

1.2 Basic Design Approach

Two APIs are disclosed—a GCOS 8 Cobol 85 API and a UNIX C API. Those APIs are disclosed in more detail below. Run-time procedures are typically bound with the GCOS 8 and UNIX applications using the Fast-ETL service. In the case of Fast-ETL to a normal UNIX system, these procedures use sockets to transmit the data between GCOS 8 and the UNIX system. In the case of Fast-ETL to a DBSP, these procedures use the services of the SID and IO-MAN components of the DBSP product to transfer the data. SID and IO-MAN are enhanced over the existing products from assignee to provide new functions in support of data streaming; these functions are specifically designed to provide better performance for data streaming than the existing message-exchange service.

Since the Fast-ETL system relies upon the services of either sockets or SID to handle data transfers on the mainframe side, the remainder of this document often refers to Fast-ETL as working in the 'sockets environment' or the 'SID environment'. However, a Fast-ETL application may use data streams in both environments. Depending upon the environment being used to support a stream, the stream is referred to as a 'socket stream' or a 'SID stream'.

In general, the services of Fast-ETL are equally applicable to both the SID and sockets environments The exceptions to this rule are noted below, where the SID environment is more restrictive.

2 Architecture (Highest Level Design)

2.1 Description

Returning to FIGS. 7 and 8, FIG. 8 illustrates the major components of Fast-ETL over sockets. The new software components being developed for Fast-ETL are:

GCOS File Interface Procedure (GFIP)

Unix File Interface Procedure (UFIP)

Unix Server Routines (UFAP/UEXEC)

Sockets Listener (USL)

FIG. 7 illustrates the major components of Fast-ETL to DBSP. The new software components being developed for Fast-ETL are:

GCOS File Interface Procedure (GFIP)

Unix File Interface Procedure (UFIP)

Unix File Read/Write Application (UFAP)

The UFAP shown in FIG. 7 is identical to its counterpart in FIG. 8. The GFIP and UFIP components shown in FIG. 7 are similar, but not identical, to their counterparts in FIG. 8. The primary difference between the components in the two FIGs. is that in FIG. 8 the components interface to sockets while in FIG. 7 they interface with SID and IO-MAN.

In FIG. 7, there is no Unix Sockets Listener. The functions of listening for data from GCOS 8 and starting UNIX applications are performed by IO-MAN, an already existing component of the DBSP product. SID and IO-MAN are being enhanced to provide better performance for Fast-ETL.

Use of the Fast-ETL system is the same for both Fast-ETL over Unix and Fast-ETL to the DBSP. Operation of Fast-ETL starts with a user application on GCOS 8. This application uses the Fast-ETL API to open a connection to and start a UNIX application. Once this step is complete, the GCOS 8 application may use one of four modes of operation:

1. the GCOS 8 application may use the Fast-ETL API to write to a UNIX file using the UFAP application
2. the GCOS 8 application may use the Fast-ETL API to read from a UNIX file using the UFAP application
3. the GCOS 8 application may use the Fast-ETL API to send data to a UNIX application
4. the GCOS 8 application may use the Fast-ETL API to receive data from a UNIX application At any time while the connection is open, either the UNIX or the GCOS 8 application may signal an error condition to its partner using the Fast-ETL API. Also at any time while the connection is open, the GCOS 8 application may use the Fast-ETL API to signal the UNIX application that a commitment or a rollback to a previous commitment point is required. These requests from the GCOS 8 application are NOT tied to GCOS 8 commitments and rollbacks. The following is suggested:

1. Perform a GCOS 8 commitment immediately after requesting a Fast-ETL commit
2. Perform a Fast-ETL rollback immediately after a GCOS 8 rollback and restart occurs When a UFAP application receives a Fast-ETL commitment request, it saves restart information in a file in the UNIX user's home directory. The information that it saves in this file includes:
the path name of the UNIX file
the mode (sending or receiving)
the position in the GCOS 8 file
the record number of the position in the GCOS 8 file.
the position in the UNIX file
the record number of the position in the UNIX file.

Either the UNIX or the GCOS 8 application may use the Fast-ETL API to close the connection and terminate the use of the Fast-ETL service. The 166 termination of the connection causes the UNIX application to terminate.

In order to provide a Fast-ETL for RDBC functionality, two GCOS activities are utilized. This solution allows a GCOS application to gather data and write it to a UNIX file using the Fast-ETL API. The second activity that would normally run a Teradata utility that had been ported to GCOS 8, would now use an RSHELL activity in the GCOS JCL to start and monitor the Teradata utility on the Teradata machine. In this way the RDBC users can move from an environment where execution of the utilities are on GCOS 8 to an environment where the utilities are executed on UNIX but controlled from GCOS 8.

A temporary file is no longer created on GCOS, but is created instead on UNIX using the ETL function. The RDBC utility is started by an RSHELL command that transfers the results of the utility execution back to GCOS for analysis and action.

For Teradata utilities, such as FastExport, that return data to GCOS 8; the two activity GCOS process uses RSHELL in activity one to ran the utility, then a Fast-ETL in activity two to read the data from the UNIX output file and into a GCOS program for storage in a GCOS file.

In moving the data between GCOS 8 and the Teradata UNIX, the Fast-ETL will typically handle data conversions.

RDBC utilities that will be supported include BTEQ, FastLoad, MultiLoad, FastExport, and TPUMP.

2.2 Environment

While the target environment for the UNIX components is any UNIX platform (SUN, HP, BULL), these components are being built and initially tested on Assignee platforms running UNIX.

3 Component Design

FIG. 9 shows all of the major components of Fast-ETL. The entirely new components for Fast-ETL are:
1. GFIP 171—GCOS File Interface Procedure
2. UFIP 181—Unix File Interface Procedure
3. UFAP 166 and UEXEC
4. USL 168—Sockets Listener The existing DBSP components that are being enhanced for Fast-ETL are SID 156 and IO-MAN 162.

3.1 GCOS File Interface Procedures (GFIP) 171

As FIG. 9 shows, GFIP 171 and UFIP 181 are similar in their decomposition and they consist of the sub-components entitled:
1. ECM 170, 180—ETL Connection Manager
2. RM 172, 182—Record Manager
3. SIDI 174, 184—SID Interface
4. SOCKI 176, 186—Sockets Interface 3.1.1 ETL Connection Manager (ECM) 170

GFIP's ECM 170 component provides the GCOS 8 user application with the API defined in the Section entitled "EIS GCOS 8 Cobol-85 API". ECM 170 manages the Fast-ETL connections established by an application, creates and responds to records with the record-type codes defined hereinbelow, and uses the services of Record Manager 172 to block and unblock records.

The remainder of this section uses a number of diagrams that portray the actions taken by GFIP and UFIP for various ETL calls. In these diagrams, the lines with arrows (e.g., →) show when data crosses the socket from GFIP to UFIP or vice versa. These diagrams do not show successful status being returned for an ETL call; the return status is shown only when it is an error or exception status.

3.1.1.1 Open

A transfer between GCOS 110 and UNIX 112 is typically initiated by the GCOS application calling X_ETL_OPEN. One of the parameters to this function indicates which direction records are being transferred. The following Table 3.1.1.1 illustrates the interaction between GFIP 171 and UFIP 181 for this function: REFER TO FIG. 12.

When records are being sent from UNIX to GCOS, GFIP immediately flushes the buffer containing the open request record (as is shown in the preceding paragraph). However, when records are being sent from GCOS to UNIX, GFIP does not immediately flush the buffer containing the open request record. Instead, it waits until the application performs a subsequent ETL call such as X_ETL_WRITEREC or X_ETL_CLOSE.

There is no response to the open request. The response is not present in order to speed up transfers, especially short ones, If the UNIX application encounters an error processing the open request, the error is reported to the GCOS application when it performs a subsequent ETL call (e.g., X_ETL_CLOSE).

3.1.1.2 Close

The close function terminates a transfer. The close process is started by the node sending records. The close function waits for a response from the other node, so that the sender can verify that all the records sent have been processed successfully.

When GCOS is sending records to UNIX, the GCOS application calls the close function first to indicate the end of the transfer. The following Table 3.1.1.2.1 illustrates the interaction between GFIP 171 and UFIP 181 in this case: REFER TO FIG. 13.

When GCOS is receiving records from UNIX, the UNIX application calls the close function first to indicate the end of the transfer. The following Table 3.1.1.2.2 illustrates the interaction between GFIP and UFIP in this case: REFER TO FIG. 14.

3.1.1.3 Abnormal Close

The close function terminates a transfer. The close process is normally started by the node sending records. In case of an error, the receiving node can call close to initiate an abnormal close.

The following Table 3.1.1.3.1 shows an abnormal close occurring while sending data from GCOS to UNIX. REFER TO FIG. 15.

The following Table 3.1.1.3.2 shows an abnormal close occurring while sending data from UNIX to GCOS. REFER TO FIG. 16.

NOTE:

When either node sends an error record, that node enters a loop receiving records sent by the other node. While in this loop, records are discarded until the error response record is received.

3.1.1.4 Write Record

The write record function works in conjunction with the read record function on the other node.

The following Table 3.1.1.4.1 shows the GCOS application sending records to the UNIX application. The write is shown occurring before the read, but this is not required. If the read is executed before the sender has executed a write, the read will be delayed until a record is received (or until the specified timeout occurs). REFER TO FIG. 17A.

The following Table 3.1.1.4.2 shows the GCOS application receiving records from the UNIX application. The write is shown occurring before the read, but this is not required. If the read is executed before the sender has executed a write, the read will be delayed until a record is received (or until the specified timeout occurs). REFER TO FIG. 17B.

3.1.1.5 Read Record

The read record function works in conjunction with the write record function on the other node. The diagrams in the previous section show this.

3.1.1.6 Execute Command

The following Table 3.1.1.6.1 shows the GCOS application executing a UNIX command: REFER TO FIG. 18.

3.1.1.7 Checkpoint

The following Table 3.1.1.7.1 shows the GCOS application executing a Checkpoint Request. REFER TO FIG. 19.

The following Table 3.1.1.7.2 shows the GCOS application executing a Rollback Request. REFER TO FIG. 20.

3.1.2 Record Manager 172

GFIP's Record Manager 172 component is called by ECM 170 and provides ECM 170 with services that are independent of Fast-ETL record-type. These services include:

packing records into buffers and sending these buffers to UFIP receiving buffers from UFIP, unpacking the records from the buffers, & giving the records to ECM 170

Record Manager provides the following functions to ECM 170:

putrec getrec flush open terminate 3.1.2.1 SIDI—SID Interface 174

Record Manager 172 calls SIDI 174 when a Fast-ETL connection is established over SCSI hardware to a DBSP. SIDI 174 calls SID's Send Message and Receive Message functions. SIDI 174 provides the following functions to Record Manager:

Send a Buffer

Get a Buffer 3.1.3 SOCKI—Sockets Interface 176

Record Manager 172 calls SOCKI 176 when a Fast-ETL connection is established over TCP/IP to a UNIX platform. SOCKI 176 calls the Sockets 167 functions of Accept, Close, Connect, Send, and Recv. SOCKI 176 provides the same functions to Record Manager as SIDI 174, and those functions are described in the preceding section.

3.2 UNIX File Interface Procedures (UFIP)

UFIP 181 is identical in its design to GFIP 171, which is described above. The code is not identical because of the following differences:

GFIP employs a VMPS based status return structure. UFIP uses the UNIX convention of an integer status return value.

UFIP supports a caller specified timeout value. GFIP blocks until UFIP returns an error, or disconnects.

GFIP performs the 9 to 8-bit conversions required for integers. This occurs in the integer fields of the ETL buffer header, in the ETL record header, and in user data for ETLBITS data format. In addition, GFIP calls the data conversion routines required for NCR RDBC support.

3.3 UNIX File Read/Write Application—UNIX Execute Command (UFAP/UEXEC)

This application is used when the records sent to and received from GCOS are to be written to or read from a UNIX file. It supports all three formats described below (i.e. ETLASCII, ETLRAW, ETLBITS). It uses the interface described below. It will be described in the documentation as an example.

Figure 10:
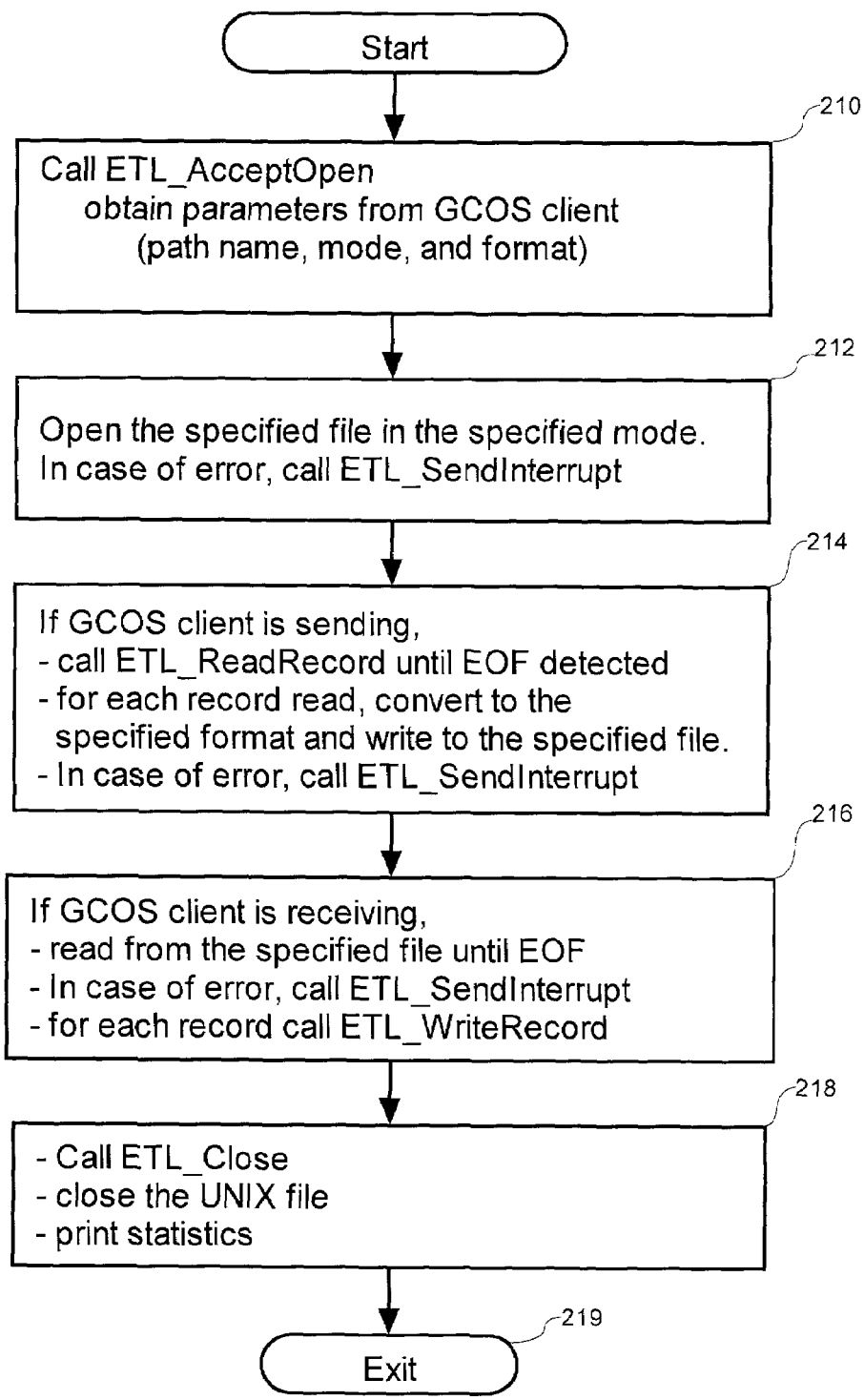
FIG. 10 is a flowchart that illustrates the operation of UFAP application, in accordance with a preferred embodiment of the present invention.

FIG. 10 is a flowchart that illustrates the operation of UFAP application, in accordance with a preferred embodiment of the present invention. It starts by calling ETL_AcceptOpen to obtain parameters from the GCOS client, namely the path name, mode, and format, step 210. It then opens the specified file in the specified mode, step 212. Next, if the GCOS client is sending, UFAP calls ETL_ReadRecord for each record until EOF (or an Error) is detected, step 214. For each record read, convert it to the specified format and write it to the specified file. In case an error is detected, Alternatively, if the GCOS client is receiving, the specified file is read until EOF (or an Error), step 216. For each record read, ETL_WriteRecord is called. In case an error is detected, ETL_SendInterrupt is called. When EOF has been detected, ETL_Close is called, the UNIX file is closed, and statistics are printed, step 218. UFAP then exits indicating either success or failure as required, step 219.

3.4 UNIX Sockets Listener (USL) 168

The USL 168 component is a daemon to start application programs on UNIX when requested to by GCOS clients. It is used when the sockets 167 interface is used. When the SCSI hardware interface is used, IO-MAN 162 performs the function of starting application programs.

When the UFAP 166 server is requested, USL 168 will execute it from the installed location. When a command is to be executed, a Korn shell will be launched to process the command.

The USL 168 is typically started when UNIX starts and executes continuously. This is usually done by placing an entry in the UNIX/etc/inittab file. The ETL installation script typically provides a mechanism to help a user do this. If the USL 168 aborts for some reason, administrator intervention will be required. There is no interaction between the service processor and the USL 168.

The USL 168 requires "root" privilege. This allows it to load and execute each application program as the requested userid. The GCOS userid in use will be sent by GFIP to the USL. The USL will expect to find a UNIX userid of the same name. Its home directory will be made the current directory for the command/open. In addition, a file must be present in this home directory with the name '.etlhosts'.

The USL will search for an optional file in the home directory, with the name '.environment.etl'. If found, this file will be passed to the KORN shell to establish environment variables for the command.

Figure 11:
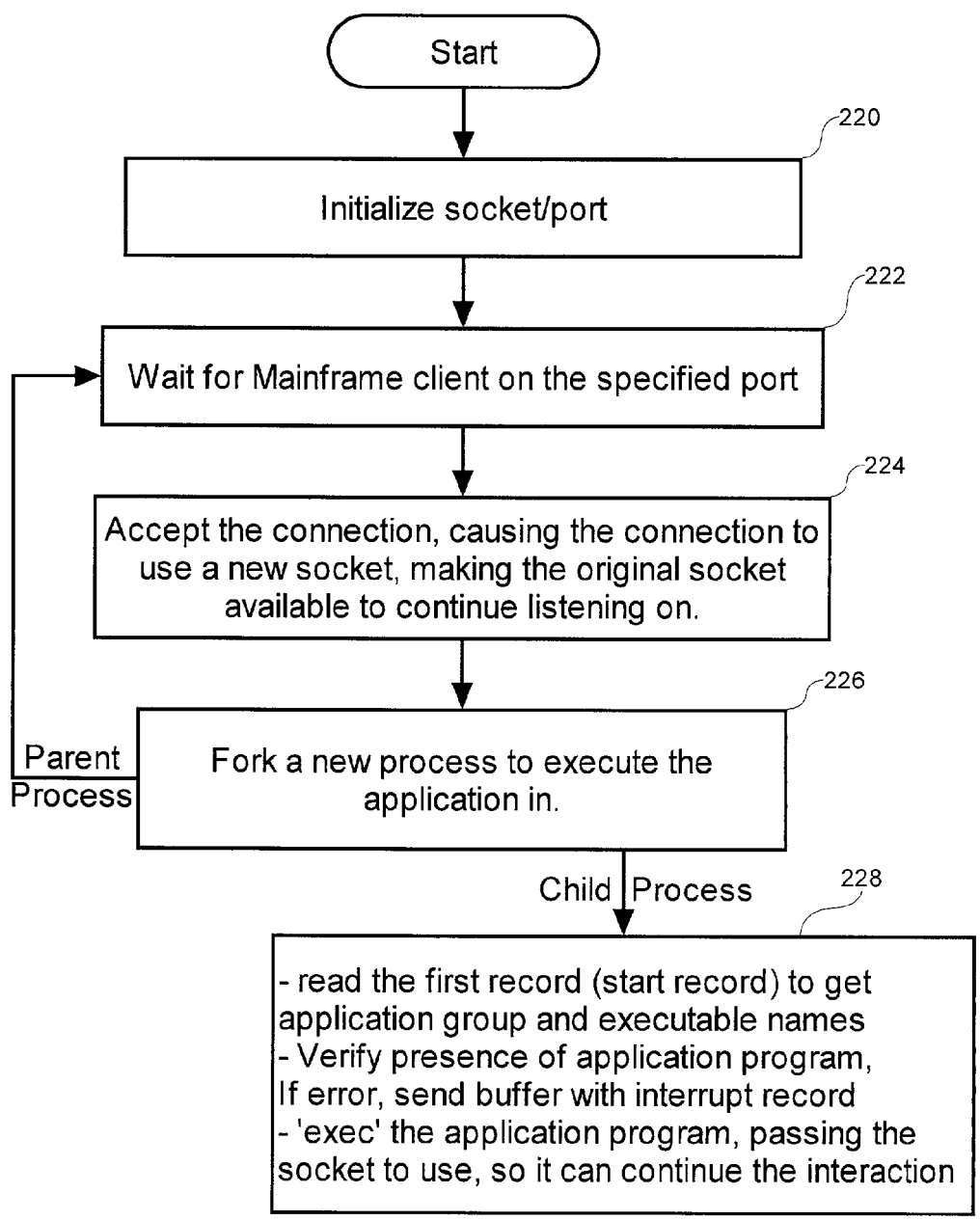
FIG. 11 is a flowchart illustrating the operation of USL software, in accordance with a preferred embodiment of the present invention.

FIG. 11 is a flowchart illustrating the operation of USL 168 software, in accordance with a preferred embodiment of the present invention. USL starts by initializing the appropriate socket or port, step 220. Then USL enters a loop, where it starts by waiting for the Mainframe client on the specified port or socket, step 222. When a connection is tendered, it is accepted, causing the connection to use a new socket, making the original socket available to continue listening on, step 224. Then, a new process is started (in UNIX, by FORKing) to execute the application program in, step 226. USL 168 then loops, starting again with step 222. Meanwhile, the new child process, started in step 222, reads the first record received to get the applicable application group and executable names. The presence of the application program is then verified, and if an error occurs, a buffer is sent with the interrupt record. Then, the application program is 'exec'ed (or called), passing it the socket to use, so that it can continue the interaction, step 228.

3.5 Server Interface Domain (SID) 156

To support optimal Fast-ETL performance, SID 156 provides two new functions, Send Message and Receive Message. These functions differ from SID's Pass Messages function, which is the function used to exchange SQL data with a DBSS, in that they do not require a DBSS message for every GCOS message and vice-versa.

Like the Pass Messages function, the Send Message and Receive Message functions do not send the GCOS UNLINK message to IO-MAN 162. SID sends the GCOS UNLINK message as a result of calls to SID 156 from GCOS 8's Integrity Control Software. Since UFIP 181 always tells SID 156 that the commitment mode is Oracle Mode, SID 156 sends the GCOS UNLINK message for a Fast-ETL application at end of program for batch or end of transaction for TP8.

SID 156 does not allow a GCOS application to mix stream (Fast-ETL) and DBSP modes. SID 156 determines the mode of the application when the application calls SID 156 for the first time. If the first call to SID 156 is a Pass Messages call, then SID 156 classifies the application as a DBSP application and returns an error status if the application subsequently calls its Send Message or Receive Message functions. Similarly, if the first call to SID 156 is a Send Message or Receive Message call, then SID 156 classifies the application as a stream application and returns an error status if the application subsequently calls its Pass Messages function.

The interface to SID's Send Message and Receive Message functions is specified below. The remainder of this section provides an operational description of these new functions.

3.5.1 Send Message Function

When its Send Message function is called, SID sends the caller's data in a GCOS_stream message to the designated DBSS. SID does not wait for a response from the DBSS.

SID and the DBSS employ a flow-control mechanism to ensure that a GCOS application does not overflow the buffers of the DBSS when the GCOS application is sending data faster than it can be processed by the DBSS. This flow-control mechanism works as follows.

1. SID assumes that it has the right to send a pre-defined number of GCOS_stream messages to a DBSS following the GCOS_link message. This pre-defined number is defined at compile time; its initial value is 8.
2. To allow SID to send more than the initial pre-defined number of GCOS_stream messages, the DBSS must send to SID a dbsp_credit message for the application.
3. If an application calls Send Message after SID has exhausted its credit (the right to send more GCOS_stream messages) for the application, then SID performs a read I/O and waits for the DBSS to extend additional credit via the dbsp_credit message. If SID fails to obtain any credit within the timeout period, then SID returns a timeout status to the application.
4. Both SID and the DBSS count each message that they send on behalf of an application, and they pass this counter value in the message header of each message. The first message that SID sends on behalf of an application, the dbsp_link, message has a message_count value of one. SID increments this count for each subsequent message. The DBSS grants SID credit in the dbsp_credit message by specifying the highest message_count value that SID may issue before it must wait for additional credit.
5. A DBSS may not withdraw credit that it has extended to SID. This means that a DBSS is not allowed to send a dbsp_credit message with a message_count value that is less than the value sent in a previous dbsp_credit message for that application. The only exception to this rule is in the case where the message_count value rolls over; i.e., the 36-bit counter overflows because more than 68 billion messages have been sent for an application. In this case, the message_count value goes from a very high value to a very low value in consecutive dbsp_credit messages. The message_count value in the later message should not exceed the maximum number of credits that a DBSS extends at one time. Upon receiving a dbsp_credit message reflecting message_count rollover, SID clears its internal counter so that the next GCOS_stream message that it builds has a message_count of one.
6. Credits apply only the GCOS-stream and dbsp-stream messages. Other message types, e.g., the GCOS unlink message, may be sent without regard to credit.

Because of this flow-control mechanism, a Send Message caller may be delayed while SID waits for credit. If credit is not received within the caller's timeout period, SID returns to the caller with a timeout status. The Send Message caller may specify a small timeout value (e.g., 5 milliseconds) to prevent a significant delay.

The following four Tables illustrate the message exchanges between SID and IO-MAN when an application is streaming data to a DBSS. If you view this document on your PC, use the page layout view for these diagrams. REFER TO FIGS. 21–24.

Note that the dbsp_credit message can be received in response to any read I/O performed by SID. If all of SID's users are sending stream data, then SID does not issue a read I/O until it is close to exhausting its credit for one of the users. SID issues this read I/O for the sole purpose of obtaining one or more dbsp_credit messages.

3.5.2 The Receive Message Function

When its Receive Message function is called, SID examines its buffers to determine whether it has a dbsp_stream message for the application. If it does, SID returns this message to the application. If not, then SID waits for a dbsp_stream message to be transmitted by the specified DBSS. If this message does not arrive within the caller's timeout period, then SID returns to the caller with a timeout status. The Receive Message caller may specify a very small timeout value (e.g., 5 milliseconds) indicating that it cannot be delayed waiting for a message to arrive.

SID and the DBSS employ a flow-control mechanism to ensure that a DBSS does not overflow SID's buffers when the DBSS is sending data faster than it can be processed by the GCOS application. This flow-control mechanism works like the mechanism for the Send Message function.

1. The DBSS assumes that it has the right to send a pre-defined number of dbsp_stream messages to SID following the GCOS_link message.
2. To allow a DBSS to send more than the initial pre-defined number of dbsp_stream messages, SID must send a GCOS_credit message for the application.
3. SID replenishes the credits for an application only when the application calls the Receive Message function. When an application receives a dbsp_stream message that is close to exhausting the credit extended to a server, SID places a GCOS_credit message in one its output buffers and immediately issues a write I/O to transmit it to the DBSS.
4. Both SID and the DBSS count each message that they send on behalf of an application, and they pass this counter value in the message header of each message. The first message that a DBSS sends on behalf of an application has a message_count value of one. The DBSS increments this count for each subsequent message. SID grants a DBSS credit in the GCOS_credit message by specifying the highest message_count value that the DBSS may issue before it must wait for additional credit.
5. SID may not withdraw credit that it has extended to a DBSS. This means that SID is not allowed to send a GCOS_credit message with a message_count value that is less than the value that it sent in a previous GCOS_credit message for that application. The only exception to this rule is in the case where the message_count value rolls over; i.e., the 36-bit counter overflows because SID has received more than 68 billion messages for an application. In this case, the message_count value that SID uses in the GCOS_credit message goes from a very high value to a very low value in consecutive GCOS_credit message. The value that SID places in the later message does not exceed the maximum number of credits that may be extended at one time, which is a value that is pre-defined at compile time.

SID typically must buffer multiple messages for an application when a DBSS sends dbsp_stream messages faster than the GCOS application receives them. Because of the credit mechanism, SID is not required to buffer more messages than the number of credits that it has extended to a DBSS. When SID buffers multiple messages for an application, it leaves the messages in their original input buffers and employs fields in the message header to place the messages in a receive queue for the application.

The following four Tables illustrate the message exchanges between SID and IO-MAN when a DBSS is streaming data to a GCOS application. REFER TO FIGS. 25–28.

Table 3.5.2.5 below depicts the interactions between the Fast-ETL components for a GCOS stream (i.e. a data stream going from GCOS 8 to UNIX). REFER TO FIG. 29.

Table 3.5.2.6 below depicts the interactions between the Fast-ETL components for a UNIX stream (i.e. a data stream going from UNIX to GCOS 8). REFER TO FIG. 30.

3.6 DBSP I/O Manager (IO-MAN)

3.6.1 Link Support

3.6.1.1 Link Change

The typical buffer containing the link request to start a stream is expected to contain more than one GCOS_streaming message following the link request. These GCOS_streaming messages will not have been associated with a linked SC (their DBSP_Token's are zero), so there is no SC to send them to. Previously, if a data message was received with a DBSP_Token of zero, it was treated as an "orphan". It was determined that the existing "orphan" processing logic was insufficient because it could handle only one message. The fact that this logic would require some work to handle what is expected to be a common case led to an evaluation of many alternatives.

3.6.1.1.1 Replacement of Orphan Processing with Immediate Queuing

The existing orphan logic in idt.c and scct.c will be replaced. Rather than putting an entry in the orphan list, data messages received without a DBSP_Token will be placed into the appropriate SC message queue.

Table 5.6.1 below for a state transition diagram that depicts the sequence of events for a typical link followed by GCOS_stream messages that have an undefined dbsp token.

3.6.2 Buffer Sequencing Support

Message buffers coming from GCOS will contain a 36 bit sequence number as previously mentioned in the Issues section. Module idt.c, the definition of structure MsgHdr in dct.h and function decoder.c will be expanded to handle the 36 bit number and corresponding rollover potential.

3.6.3 Credit Support

A credit extension will be issued from idut.c to SID once the number of processed messages for the SC equals the issued credit minus 4. For example, if the credit extended to SID is 32, than once 28 messages (predominately GCOS_stream messages) have been processed, idut.c will send a dbsp_credit message with an additional 8 credits (40 total). The reason for sending the credit before it is exhausted is to ensure that SID does not stall and possibly time-out waiting for the credit. Either of those two reactions would be detrimental to performance.

The key variables used to support credit management are: REFER TO FIG. 31.

The input message sequence number is the MsgHdr IgBufSeqNum which is defined in dct.h and decoded from the SID DBSP Protocol Message Header by decoder.c.

3.6.4 GCOS_Stream Message Handling Strategy

The strategy for sending GCOS_stream messages from idt to the ETL SC will differ from other transfers (e.g., data messages). The prior art message passing implementation consists of IDT placing the message header in the SC queue and the message content into shared memory (shared memory 4). The problem is that with this strategy the SC must have visibility to IO_MAN's shared memory 4. With users writing SC stream processing code, this could lead to both accidental and malicious problems.

An efficient solution to getting the GCOS_stream to the SC without using shared memory is to put the entire message in the SC queue. The data content memory is then managed by AIX and IO_MAN's shared memory will not be visible to the SC application's GCOS_stream processing software.

3.6.5 The New IOMI Module

New functions are added to interface the ETL processing logic with IO_MAN in a new module named IOMI. These include:

ETLgetBuffer
ETLsendBuffer
ETLclose
ETLsendInterrupt

ETLgetBuffer will read the SC's queue searching for the next GCOS_stream message and pass it with its 36K buffer back to the SC. A second function, ETLsendBuffer will send dbsp_stream buffers to idut.

The ETLgetBuffer function will register the fact that it processed a buffer with idut's credit management logic.

The ETLclose function will send a message that the stream is closed to SID.

The ETLsendInterrupt will be used to send status to SD. It could also be used to initiate a checkpoint.

4 Global Cross Reference

4.1 Data Structures and Tables

4.1.1 Socket Header Format

Both GFIP and UFIP send a socket header before each buffer. The socket header is shown below in Table 4.1.1: REFER TO FIG. 32.

4.1.2 GFIP/UFIP Buffer Format

GFIP 171 and UFIP 181 block records into buffers for efficiency. In the preferred embodiment, in order to maintain compatibility with the LCB interface, the buffer size is limited to 32 k bytes.

In the preferred embodiment, buffers are defined and exchanged in a 9-bit byte format. This allows GFIP 171 to be more efficient in GCOS CPU cycles, with the tradeoff being more UNIX CPU cycles.

The buffer format is defined below in Table 4.1.2.1: REFER TO FIG. 33.

Records are NOT split across buffers. Therefore, the maximum record size in bytes that can be accommodated is calculated as follows:

$$\text{Maximum record size} = 64k - \text{max SID hdr} - \text{ETL header}$$
$$= 65536 - 256 - 128$$
$$= 65152$$

However, the X_ETL_WRITEREC function and its counterpart on UNIX restrict the amount of data that an application can send in one record to an even 64,000 bytes.

4.1.3 Fast-ETL Record Types

The data exchanged between GFIP and UFIP consists of records, each with a header, supplying its type and length. These records are grouped into a buffer, to improve performance by avoiding a call to SIDI or SOCKI for each record. When the SCSI hardware is used, the buffer built by GFIP or UFIP is encapsulated by SID or IO-MAN respectively, into GCOS Stream Messages and DBSP Stream Messages. These stream messages are described hereinbelow. When the sockets interface is used, GFIP/UFIP buffers are encapsulated by a socket header.

The following record types are exchanged between GFIP and UFIP:

Checkpoint Request Record
Checkpoint Response
Close Response Record
Data Record
EOF Record
Error Record
Error Response Record
Execute Request Record
Open Request Record
Rollback Request Record
Rollback Response Record
Terminate Request Record
Terminate Response Record The following records are only sent from GFIP to UFIP. They do not normally have a response. An error record can be sent in response if an error occurs.

Execute Request Record
Open Request Record

The following records are only sent from GFIP to UFIP and have a record defined for a successful response. An error record can be sent instead of the normal response, if an error occurs.

Checkpoint Request Record
Rollback Request Record
Terminate Request Record

The following records are only sent from UFIP to GFIP and do not have a response.

Checkpoint Response Record
Rollback Response Record
Terminate Response Record

The following records may be sent by either GFIP or UFIP. The Close Request Record and the Error Record have a response; the other records in the list do not.

Close Request Record
Close Response Record
Data Record
EOF Record
Error Record
Error Response Record Integers in the following definitions are multiples of 8-bit bytes, i.e. 8-bits, 16-bits, or 32-bits. Integers are unsigned and restricted in value:

8-bit fields: 0<=value<=511

16-bit fields: 0<=value<=65535

32-bit fields: 0<=value<=2**32−1

Integers are passed between the GCOS and UNIX with the most significant byte sent first with less significant bytes following. This is the natural GCOS byte order. However, other orders are also within the scope of this invention.

'C' strings in the following definitions are ASCII characters, each in an 8-bit byte. Trailing white space has been truncated and a NULL character terminates the string.

Records have a common header with the following format shown below in Table 4.1.3: REFER TO FIG. 34.

Both 'data size' and 'record type' are integers with the most significant byte in the lowest addressed byte. The values in these two fields have maximum value of 65535.

'data size' is the number of bytes in the record; it includes itself (2 bytes), the record type (2 bytes), and the record data. The maximum value is 64004; this is arbitrarily set, the actual maximum could be 65152.

'record type' is an integer with values between 0 and 65535. Zero is not used. Values 32768 and higher are reserved for system types. Values from 1 to 32767 are user types (there is no mechanism provided for users to use this field).

4.1.4 Open Request

An Open Request record is sent from GCOS to UNIX when an application calls the X_ETL_OPEN procedure: REFER TO FIG. 35.

Userid is a NULL-terminated C string. Its maximum length is 63 characters, excluding the NULL-terminator. Some systems may have lower limits. It is the Userid assigned to the GCOS program that is making the ETL calls.

Pathname is a NULL-terminated C string. Its maximum length is 1024 characters, excluding the NULL-terminator. It is the same as the ETL-PATHNAME parameter except that trailing white space has been deleted and the NULL-terminator has been added.

If the UNIX server detects an error processing the open request record, it sends an error record to GCOS. Otherwise, it does not send a response record; i.e., there is no execute response record.

4.1.5 Execute Request

An Execute Request record is sent from GCOS to UNIX when an application calls the X_ETL_EXECUTE procedure. It is utilized to remotely execute commands on a UNIX system from a GCOS system. REFER TO FIG. 36.

Userid is a NULL-terminated C string. Its maximum length is 63 characters, excluding the NULL-terminator. Some systems may have lower limits. It is the Userid assigned to the GCOS program that is making the ETL calls.

Command is a NULL-terminated C string. It is the same as the ETL-COMMAND parameter except that trailing white space has been deleted and the NULL-terminator has been added.

If the UNIX server detects an error processing the execute request record, it sends an error record to GCOS. Otherwise, it does not send a response record; i.e., there is no execute response record

4.1.6 Close Request

The close request record is only used for connections established by X_ETL_OPEN. It is sent from the sender to the receiver. If the 'Open Action' field in the open request record was ETLWRITE, GCOS is the sender. If it was ETLREAD, Unix is the sender. This record is sent following the data records. REFER TO FIG. 37.

4.1.7 Close Response

A Close Response record is sent by the receiving node when a Close This record is sent by the UNIX server when a Close Request is successfully processed. REFER TO FIG. 38.

4.1.8 Terminate Request

The terminate request record is sent by GCOS to UNIX to terminate a command. REFER TO FIG. 39.

4.1.9 Terminate Response

The Terminate Response record is sent by Unix to GCOS when a terminate request has been processed. REFER TO FIG. 40.

4.1.10 Data Record

The GCOS data record contains application data sent from GCOS to UNIX or from UNIX to GCOS. REFER TO FIG. 41.

4.1.11 Checkpoint Request Record

A Checkpoint Request record is sent from GCOS to UNIX. REFER TO FIG. 42.

4.1.12 Checkpoint Response Record

The checkpoint response record is sent from UNIX to GCOS after a checkpoint request is successfully processed. If there is a processing a checkpoint request, an error record is sent instead of a checkpoint response record. REFER TO FIG. 43.

4.1.13 Rollback Request Record

A Rollback Request record is sent from GCOS to UNIX requesting a rollback. REFER TO FIG. 44.

4.1.14 Rollback Response Record

A Rollback Response record is sent from UNIX to GCOS after a Rollback Request is successfully processed. If an error is encountered processing a Rollback Request, an Error Record is sent instead of a Rollback Response record. REFER TO FIG. 45.

4.1.15 Error Record

An Error record is sent when an error has been encountered. These are discussed above. REFER TO FIG. 46.

The Error Source is defined as:
1 UFIP
2 UFAP
3 UEXEC
4 AIX

An Error Code is a 4 byte integer. The following statuses are recognized by both nodes, and translated to the status appropriate for the node:
1 no checkpoint for rollback request
2 connection closed prematurely
3 executable not found
4 executable not executable (e.g. insufficient permission)

4.1.16 Error Response Record

The error response record is sent to acknowledge an error record. REFER TO FIG. 47.

4.1.17 EOF Record

The EOF record is used only for connections established by X_ETL_EXECUTE. GCOS sends this record type to UNIX to close stdin. UNIX sends it to GCOS to close stdout. There is no EOF response record. REFER TO FIG. 48.

4.2 Fast-ETL Message Types

SID and IO-MAN utilize four new message types to support Fast-ETL. These message types are:
GCOS Stream Message
DBSP Stream Message
GCOS Credit Message
DBSP Credit Message

4.3 Data Files

4.3.1 Restart Information File

The Restart Information File is used only for connections established by X_ETL_OPEN. This file is used by UFAP to process 'X_ETL_CHECKPOINT' and 'X_ETL_ROLLBACK' requests from the GCOS client. It is located in the following directory:

~<userid>/etl

The file name has two variations:
1. <base file name>
2. <base file name><sequence number>

The 'base file name' is the first 24 characters of the AIX file name after removing leading directory names. If necessary to ensure uniqueness, a sequence number is added to the base file name to produce the file name. The 'sequence number' is a decimal number consisting of eight ASCII digits.

Whenever Restart Information File is used, the path name contained within it (see Table 4.3.1) must be compared to be sure that the correct file is being accessed. REFER TO FIG. 49.

A Restart Information File is used by UFAP to process 'X_ETL_CHECKPOINT' and 'X_ETL_ROLLBACK' requests from the GCOS client. It is typically saved in the following directory:

~<userid>/etl

The file name is: <base file name><sequence number>
The 'base file name' is the first 24 characters of the UNIX file name after removing leading directory names.
The 'sequence number' number is a 8 digit decimal string that is used to make the file name unique. Whenever this file is used, the path name contained within it (see Table 8.3.1) must be compared to be sure that the correct file is being accessed.

5 EIS

5.1 GCOS 8 Cobol-85 API

This section specifies the GCOS 8 Cobol-85 interface for the Fast-ETL product. The interface provides a record oriented connection between the programs using it. The program on GCOS 8 acts as a client, and the Fast-ETL program on UNIX acts as a server.

5.1.1 Copy File

The copy file 'ETL_DATA_H' contains the following definitions in Table 5.1.1: REFER TO FIG. 50.

5.1.2 GCOS Status Return Structure and Codes

GFIP (GCOS File Interface Procedures) is the name of the software component of the ETL product that provides the GCOS API for ETL, GFIP returns status to the caller in the ETL-STATIJS-RTN structure, which is located in the copy file described in Section A.1.1. This structure follows the format defined for Virtual Mode Programmatic Services (VMPS). Specifically, it follows the format identified as 'unpacked' in the VMPS Reference Manual (LC35). The remainder of this section describes the individual fields of the ETL-STATUS-RTN structure.

GFIP uses the ETL-PRIMARY-STATUS field to report the overall result of the call to the ETL function. GFIP sets ETL-PRIMARY-STATUS to one of three values:
1. Service Successful (a value of 0)
2. Service Exception (a value of 2)
3. Service Failed (a value of 3)

GFIP returns 'Service Successful' when an ETL function executes successfully.

GFIP returns 'Service Exception' when the ETL function executes successfully, but does not complete normally. GFIP returns this result in only five instances:
1. The X_ETL_READREC function needs to report the end-of-file condition.
2. The X_ETL_READREC function needs to report that a record was truncated.
3. The X_ETL_TERMINATE function needs to report that the UNIX command was forcibly terminated.
4. The X_ETL_TERMINATE function needs to report that stdout data was discarded.
5. The X_ETL_TERMINATE function needs to report that both stdout data was discarded and the UNIX command was forcibly terminated.

GFIP returns 'Service Failed' when an error occurs. In this case, the ETL-IMMEDIATE and ETL-ORIGINAL fields provide more information regarding the error.

GFIP places a non-zero value in ETL-ERR-MSG-LENGTH field when ETL-ERR-MSG-TEXT contains a text message pertaining to the status. The value of ETL-ERR-MSG-LENGTH is the number of characters in the message. If ETL-ERR-MSG-LENGTH is zero, no message is present and the content of ETL-ERR-MSG-TEXT is undefined. When the status is ETLCONNERR, ETL-ERR-MSG-TEXT contains the text provided by UFAP when it closed the connection.

ETL-ERR-MSG-TEXT may contain more than a one-line message. When this is the case, each message line is terminated by a line-feed character, and no line exceeds 80 characters excluding the line-feed character.

GFIP always sets the ETL-TOKEN field to zero.

GFIP always sets the ETL_IMMD-FCGI field to a value of "AFTA". This value indicates that GFIP is the source of the values contained in the ETL-IMMEDIATE fields.

GFIP does not place a fixed value in the ETL-ORIG-FCGI field. GFIP usually places one of the following values in ETL-ORIG-FCGI: AFTA, AFTB, AFTC, or ARNS.

GFIP puts 'AFTA' in ETL-ORIG-FCGI when it is the original source of an error status, as opposed to being a propagator of an error status produced elsewhere.

GFIP puts 'AFTB' in ETL-ORIG-FCGI when a status originates from one of the UNIX components of the ETL product.

GFIP puts 'AFTC' in ETL-ORIG-FCGI when a status originates from one of the procedures that perform RDBC data conversion.

GFIP puts 'ARNS' in ETL-ORIG-FCGI when a status originates from GCOS 8's Sockets software. In this case, the ETL-ORIG-MAJOR field always contains a value of one, and the ETL-ORIG-MINOR field contains the error number provided by Sockets.

Table 5.1.2 below shows all the codes that GFIP stores in the ETL-PRIMARY-STATUS, ETL-IMMD-MAJOR, and ETL-IMMD-MINOR fields. GFIP also places the major and minor codes shown in Table 5.1.2 in the ETL-ORIG-MAJOR and ETL-ORIG-MINOR fields whenever it places 'AFTA' in ETL-ORIG-FCGI. REFER TO FIG. 51.

5.1.3 Open

CALL "X_ETL_OPEN" USING ETL-STATUS-RTN,
ETL-FILE-ID,
ETL-PARAMETER-BLOCK,
ETL-PATH-NAME.

This procedure is one of two (X_ETL_EXECUTE is the other) that establish a connection to a server on UNIX. This procedure establishes a connection to the UNIX file server (UFAP) using the sockets interface.

The connection established by this procedure is a unidirectional connection used to read or write UNIX files from a GCOS program. Subsequent READ, or WRITE procedures get data from or put data to the specified UNIX file. The direction supported by a connection (i.e. read or write) is determined by the ETL-OPEN-ACTION parameter. Each invocation of this procedure starts a new instance of the file server, and the UNIX file specified will be created or accessed.

The "X_ETL_OPEN" procedure blocks execution until a connection is established or an error occurs.

ETL-STATUS-RTN

ETL-STATUS-RTN is an output parameter used to determine the success of this procedure. When successful, this procedure sets ETL-PRIMARY-STATUS to zero. If an error occurs, ETL-PRIMARY-STATUS is set to a non-zero value. The ETL-IMMEDIATE and ETL-ORIGINAL fields identity the error.

ETL-FILE-ID

ETL-FILE-ID is an output parameter that is meaningful only when ETL-STATUS-RTN reports success. It identifies the connection to the server, and it is an input parameter on subsequent procedures (e.g. X_ETL_READREC or X_ETL_WRITEREC) using this connection.

ETL-PARAMETER-BLOCK

ETL-PARAMETER-BLOCK is an input parameter containing several fields:

The ETL-IPADDRESS and ETL-PORT values identify the machine to be accessed. If ETL-PORT is zero (low-value), the default port is used.

ETL-MAX-RESPONSE-TIME specifies the number of seconds that GFIP allows sockets to wait before sockets must return with a timeout status. This time value applies for the duration of the connection; i.e., it applies to all subsequent ETL calls for the connection.

ETL-OPEN-ACTION must contain one of the following values:

ETLWRITE—The client is writing records; i.e., it is sending records to the UNIX server. "X ETL_READREC" calls are not allowed for this connection.

ETLREAD—The client is reading records; i.e., it is receiving records from the UNIX server. "X_ETL_WRITEREC" calls are not allowed for this connection.

ETL-DATA-FORMAT must contain one of the following values:

ETLASCII Records sent over this connection are formatted as a standard text file record for the node that is receiving them. Records sent by GCOS have all trailing white space characters stripped from them. Records received by GCOS also have no trailing white space characters.

This format is convenient when transferring standard text files, such as source files or comma-delimited data files. Neither application needs to be aware of the file formats used by the other node.

ETLRAW Records sent over this connection are transferred as 8-bit characters. When received by GCOS, each 8-bit character is put into a 9-bit byte. No other changes are made. With the possible exception of the last record read, the length returned by the X_ETL_READREC function is the value specified by ETL-RCV-REC-SIZE.

This format is typically used by a GCOS application that needs to construct a non-text file on UNIX, and needs to be able to specify exactly what will be in the UNIX file. The sending application needs to be aware of the exact details of the other nodes file formats for this mode.

ETLBITS Records sent over this connection are transferred as a bit stream. Every 8 bytes from GCOS occupies 9 bytes in a UNIX buffer. Except for the bit padding that occurs when the record sent or received by GCOS is not a modulo 8 value, no change is made to the data.

With the possible exception of the last record read, the length returned by the X_ETL_READREC function is the value specified by ETL-RCV-REC-SIZE.

This format is useful for saving an arbitrary GCOS file on UNIX. It generally won't be usable on UNIX, but it can be transferred back intact to GCOS.

ETL-RCV-REC-SIZE specifies the size in bytes of the records that X_ETL_READREC returns when both of the following conditions are true:

1. ETL-OPEN-ACTION contains ETLREAD.
2. ETL-DATA-FORMAT contains either ETLRAW or ETLBITS.

ETL-PATHNAME

ETL-PATHNAME is an input parameter. This parameter is passed to the server and identifies a UNIX file. This parameter is processed to be convenient for the server to use as a pathname. Specifically, trailing white space characters are stripped.

The pathname may be either an absolute or relative pathname. Relative pathnames are relative to the home directory of the server process spawned by ETL's UNIX software. The home directory is derived from the USERID (account) name associated with the GCOS program performing the X_ETL_OPEN call. The USERID is converted to lower case in deriving the home directory.

If the ETL-OPEN-ACTION parameter is ETL-RECV, the file referenced by ETL-PATHNAME is accessed for reading. If ETL-SEND is specified, the file is created when it doesn't exist, and it is overwritten when it does exist.

Status Codes:

Status codes returned by X_ETL_EXECUTE include: REFER TO FIG. 52.

5.1.4 Execute

CALL "X_ETL_EXECUTE" USING ETL-STATUS-RTN,
 ETL-FILE-ID,
 ETL-PARAMETER-BLOCK,
 ETL-COMMAND.

This procedure is one of two (X_ETL_OPEN is the other) that establish a connection to a server on UNIX. This procedure establishes a connection to a UNIX shell using the sockets interface.

The connection established by this procedure is a bi-directional connection used to interact with a specified UNIX command. X ETL_WRITEREC procedures executed for this connection send data to the re-directed standard input of the command. X_ETL_READREC procedures executed for this connection will obtain data from the re-directed standard output of the command.

The GCOS application obtains data written to stderr by calling X_ETL_READREC just as it does for data written to stdout. ETL software indicates that a record is from stderr instead of stdout by applying a prefix of '*ETL*E' to the data from stderr.

Each invocation of X_ETL_EXECUTE starts a new instance of a UNIX shell to execute the specified command.

The connection established by this procedure uses a single ETL-FILE-ID to refer to stdin, stdout, and stderr for the UNIX command. Normally, X_ETL_CLOSE is called to close stdin after all data intended for stdin has been sent with calls to X_ETL_WRITEREC. This causes the UNIX command to receive an end-of-file for stdin. X_ETL_TERMINATE is called after an end-of-file is received from calling X_ETL_READREC for this connection.

The "X_ETL_EXECUTE" procedure blocks execution until a connection is established or an error occurs.

ETL-STATUS-RTN
  ETL-STATUS-RTN is an output parameter used to determine the success of this procedure. When successful, this procedure sets ETL-PRIMARY-STATUS to zero if an error occurs, ETL-PRIMARY-STATUS is set to a non-zero value. The ETL-IMMEDIATE and ETL-ORIGINAL fields identify the error.
ETL-FILE-ID
  ETL-FILE-ID is an output parameter that is meaningful only when ETL-STATUS-RTN reports success. It identifies the connection to the servers and it is an input parameter on subsequent procedures (e.g. X_ETL_READREC or X_ETL_WRITEREC) using this connection.
ETL-PARAMETER-BLOCK
  ETL-PARAMETER-BLOCK is an input parameter containing several fields:
  The ETL-IPADDRESS and ETL-PORT values identify the machine to be accessed. If ETL-PORT is zero (low-value), the default port is used.
  ETL-MAX-RESPONSE-TIME specifies number of seconds that GFIP allows sockets to wait before sockets must return with a timeout status. This time value applies for the duration of the connection; i.e., it applies to all subsequent ETL calls for the connection.
  ETL-OPEN-ACTION is not used by this procedure.
  ETL-DATA-FORMAT is not used by this procedure. The records sent to and received from this connection are implicitly formatted as ETLASCII (see X_ETL_OPEN).
  ETL-RCV-REC-STZE is not used by this procedure.
  ETL-COMMAND
  This parameter is passed to the shell as the command string to be executed. It is implicitly formatted as ETLASCII (see X_ETL_OPEN).

Status Codes:
  Status codes returned by X_ETL_EXECUTE include: REFER TO FIG. 53.

5.1.5 CLOSE
  CALL "X_ETL_CLOSE" USING ETL-STATUS-RTN, ETL-FILE-ID.
  This procedure closes a connection identified by ETL-FILE-ID and begun with a call to either X_ETL_OPEN or X_ETL_EXECUTE.
  ETL-STATUS-RTN
    ETL-STATUS-RTN is an output parameter used to determine the success of this procedure. When successful, this procedure sets ETL-PRIMARY-STATUS to zero if an error occurs, ETL-PRIMARY-STATUS is set to a non-zero value. The ETL-IMMEDIATE and ETL-ORIGINAL fields identify the error.
  ETL-FILE-ID
    ETL-FILE-ID is an input parameter that identifies the connection to the server. The value of ETL-FILE-ID was returned by the call to X_ETL_OPEN or X_ETL_EXECUTE that established the connection.
  When ETL-FILE-ID refers to a connection established by X_ETL_OPEN:
    The actions of this procedure depend upon whether the GCOS program is using the connection to write to a file (i.e., it opened the connection with ETLWRITE) or to read from a file (i.e., it opened the connection with ETLREAD),
    If the GCOS program is using the connection to write to a file, this procedure first flushes any buffered records. It then sends an end-of-file indicator to the server program and waits for the server program (UFAP) to respond. Normally, UFAP responds with an indication that all records have been successfully received. This response causes X_ETL_CLOSE to return successful status.
    UFAP may detect an error after the GCOS program has called close (e.g. there is a problem with one of the records flushed by the close). In this case, UFAP responds with an indication that it has encountered an error. This indication causes X_ETL_CLOSE to return ETLCONNERR status.
    If the GCOS program is using the connection to read from a file, then X_ETL_CLOSE simply informs UFAP that the GCOS application is ending the connection. UFAP is not given a chance to indicate whether it has any error to report.
  When ETL-FILE-ID refers to a connection established with X_ETL_EXECUTE:
    ETL-FILE-JD is used to access three files (stdin, stdout, and stderr). X_ETL_CLOSE may be used only to close stdin. The call to X_ETL CLOSE causes the UNIX command to receive an end-of-file for stdin. The GCOS program normally calls X_ETL_CLOSE after it has sent all data intended for stdin via calls to X_ETL_WRITEREC.
    After calling X_ETL_CLOSE, the GCOS program normally calls X_ETL_READREC to receive the data that the UNIX command writes to stdout and stderr. When X_ETL_READREC returns an end-of-file indication for stdout, the GCOS program would then call X_ETL_TERMINATE to end the connection.
    X_ETL_CLOSE does not wait for any response from the server when the connection is established by X_ETL_EXECUTE. Any errors reported by the server are handled when the GCOS program calls X_ETL_READREC.
    The call to X_ETL_CLOSE may be omitted for a connection established by X_ETL EXECUTE. In this case, X_ETL_TERMINATE closes stdin. When X_ETL_TERMINATE is used to close stdin, the GCOS program is not given the opportunity to receive any data written by the UNIX server to stdout or stderr. So, the GCOS program should use X_ETL_CLOSE if it is interested in receiving any data written by the UNIX server.

Status Codes:
  Status codes returned by X_ETL CLOSE include: REFER TO FIG. 54.

5.1.6 Terminate
  CALL "X_ETL_TERMINATE" USING ETL-STATUS-RTN,
    ETL-FILE-ID,
    ETL-MAX-TIME,
    ETL-COMMAND-STATUS.

This procedure closes stdin immediately, unless stdin has already been closed by a previous call to X_ETL_CLOSE. It then waits for the command to terminate. If the command does not terminate (which is indicated by an end-of-file for stdout) within the time specified by ETL-MAX-TIME, this procedure terminates the command forcefully.

This procedure blocks execution until the server program responds with a status indicating that it has completed, until an error occurs, or until the specified time has elapsed.

ETL-STATUS-RTN
ETL-STATUS-RTN is an output parameter used to determine the success of this procedure. When successful, this procedure sets ETL-PRIMARY-STATUS to zero. If an exception or an error occurs, ETL-PRIMARY-STATUS is set to a non-zero value. The ETL-IMMEDIATE and ETL-ORIGINAL fields identify the exception or error.

ETL-FILE-ID
ETL-FILE-ID is an input parameter that identifies the connection to the server. The value of ETL-FILE-ID was returned by the call to X_ETL_EXECUTE that established the connection.

ETL-MAX-TIME
ETL-MAX-TIME is an input parameter that specifies the maximum time to wait for the command to finish. Its value is the number of seconds to wait. Zero means don't wait, terminate the command immediately if it has not already finished.

ETL-COMMAND-STATUS
ETL-COMMAND-STATUS is an output parameter that contains the commands exit value.

Status Codes:
Status codes returned by X_ETL_TERMINATE include: REFER TO FIG. 55.

5.1.7 Write a Record
CALL "X_ETL_WRITEREC" USING ETL-STATUS-RTN.
  ETL-FILE-ID,
  ETL-REC-LENGTH,
  ETL-RECORD.

This procedure sends a record to the UNIX server program. X_ETL_WRITEREC moves the record located in 'ETL-record' into a collection buffer for the connection. The collection buffer is sent to the server when one of the following occurs:
  no more records can fit in the buffer,
  one of the following ETL functions is called. These functions automatically flush the buffer:
    a) X_ETL_CLOSE
    b) X_ETL_CHECKPOINT
    c) X_ETL_TERMINATE
    d) X_ETL_READREC The number of bytes sent from 'ETL-record' is specified by the ETL-REC-LENGTH parameter.

This procedure does not normally block execution. X_ETL_WRITEREC returns to the caller after placing the record in a collection buffer. If the buffer is full and cannot be written (e.g. the server is not reading records for some reason), this function waits until one of the following occurs:
  the buffer can be written,
  a timeout occurs (time limit is specified by ETL-MAX-RESPONSE-TIME),
  some other error occurs.

ETL-STATUS-RTN
ETL-STATUS-RTN is an output parameter used to determine the success of this procedure. When successful, this procedure sets ETL-PRIMARY-STATUS to zero. If an error occurs, ETL-PRIMARY-STATUS is set to a non-zero value. The ETL-IMMEDIATE and ETL-ORIGINAL fields identify the error.

ETL-FIELD
ETL-FILE-ID is an input parameter that identifies the connection to the server. The value of ETL-FILE-ID was returned by the call to X_ETL_OPEN or X_ETL_EXECUTE that established the connection.

ETL-REC-LENGTH
ETL-REC-LENGTH is an input parameter whose value specifies the number of bytes of data to be sent to the server. The maximum value that ETL-REC-LENGTH may contain is 64,000. ETL-REC-LENGTH may contain a value of zero.

ETL-RECORD
ETL-RECORD is an input parameter that contains the data to be sent to the server. Unlike most of the parameters used for ETL calls, this parameter is NOT included in the COBOL copy file 'ETL_DATA_H'.

Status Codes:
Status codes returned by X_ETL_WRITEREC include: REFER TO FIG. 56.

5.1.8 Read a Record
CALL "X_ETL_READREC" USING ETL-STATUS-RTN,
  ETL-FILE-ID,
  length of ETL-buffer,
  ETL-buffer,
  ETL-RETURNED-LENGTH
  [ON EXCEPTION imperative-statement]

This procedure gets a record sent by the server program. The maximum number of bytes that may be returned is specified by the 'length of ETL-buffer' parameter. The number of bytes returned in the record is in ETL-RETURNED-LENGTH. A return length value of zero bytes means that the server sent a zero-length record.

If a record is not available, execution is blocked until the server program returns a record or until a timeout/error occurs.

This procedure returns the status ETLEOF (end-of-file) only after all of the records sent by the server program have been read. Since X_ETL_READREC also generates an exception condition if and only if it returns the end-of-file status, GCOS programs may supply the optional 'ON EXCEPTION' clause to control the processing of end-of-file.

ETL-STATUS-RTN
ETL-STATUS-RTN is an output parameter used to determine the success of this procedure. When successful, this procedure sets ETL-PRIMARY-STATUS to zero. If an exception or an error occurs, ETL-PRIMARY-STATUS is set to a non-zero value. The ETL-IMMEDIATE and ETL-ORIGINAL fields identify the exception or error.

ETL-FILE-ID
ETL-FILE-ID is an input parameter that identifies the connection to the server. The value of ETL-FILE-ID was returned by the call to X_ETL_OPEN or X_ETL_EXECUTE that established the connection.

Length of ETL-buffer
The 'length of ETL-buffer' is an input parameter whose value specifies the maximum number of bytes of data to be received from the server. Unlike most of the parameters used for ETL calls, this parameter is NOT included in the COBOL copy file 'ETL_DATA_H'.

Instead, the length must either be placed in a variable of the program's own choosing or it may be specified by the COBOL phrase 'length of ETL-buffer', where the name 'ETL-buffer' is the name of the buffer used to receive the record.

ETL-Buffer

ETL-buffer is an output parameter that contains the record received from the server. Unlike most of the parameters used for ETL calls, this parameter is NOT included in the COBOL copy file 'ETL_DATA_H'.

If ETL-buffer is too small to contain the record that was received, then X_ETL READREC returns the amount of data that does fit in ETL-buffer, discards the remainder of the record, and returns the exception status of ETLBUFSIZE.

ETL-RETURNED-LENGTH

ETL-RETURNED-LENGTH is an output parameter that contains length in bytes of the record received from the server (in bytes).

Status Codes:

Status codes returned by X_ETL_READREC include: REFER TO FIG. 57.

5.1.9 Checkpoint

CALL "X_ETL_CHECKPOINT" USING ETL-STATUS-RTN,
ETL-FILE-ID,
ETL-CHECKPOINT-BLOCK.

This procedure causes an ETL-CHECKPOINT-BLOCK to be sent to the UNIX server program. This data is saved by UFAP so that it can be returned in response to a subsequent call to X_ETL_ROLLBACK. When the UNIX server is a customer application, that application is responsible for saving the data along with sufficient information to re-establish the current data-processing state. The ETL-CHECKPOINT-BLOCK can be used to help restart execution following a program failure, communications failure, disk failure, etc. There is no relationship between GCOS commits/rollbacks and this capability.

The X_ETL_CHECKPOINT procedure may be executed on any connection established by X_ETL OPEN. If X_ETL_EXECUTE was used to establish the connection, then user written software on UNIX must respond to checkpoint and rollback requests.

Execution is blocked until either the server program returns success or an error occurs.

The GCOS application and the UNIX server must cooperate to accomplish the checkpoint and a subsequent rollback. UFAP does this for reading and writing files on UNIX. The user application on GCOS cooperates by restarting at the appropriate point.

ETL-STATUS-RTN

ETL-STATUS-RTN is an output parameter used to determine the success of this procedure. When successful, this procedure sets ETL-PRIMARY-STATUS to zero. If an error occurs, ETL-PRIMARY-STATUS is set to a non-zero value. The ETL-IMMEDIATE and ETL-ORIGINAL fields identify the error.

ETL-FILE-ID

ETL-FILE-ID is an input parameter and refers to a connection previously established by a call to X_ETL_OPEN or X_ETL_EXECUTE.

ETL-CHECKPOINT-BLOCK

ETL-CHECKPOINT-BLOCK is an input parameter for caller-supplied data to be saved with the checkpoint.

Status Codes:

Status codes returned by X_ETL_CHECKPOINT include: REFER TO FIG. 58.

5.1.10 Rollback

CALL "X_ETL_ROLLBACK" USING ETL-STATUS-RTN,
ETL-FILE-ID,
ETL-CHECKPOINT-BLOCK.

This procedure retrieves ETL-CHECKPOINT-BLOCK from the last successful checkpoint. This information would normally be used to restart execution following a program failure, communications failure, disk failure, etc. There is no relationship between GCOS commits/rollbacks and this capability. Both need to be considered by the programmer independently.

The X_ETL_ROLLBACK procedure may be executed on any connection established by X_ETL_OPEN. If X_ETL_EXECUTE was used to establish the connection, then the software on UNIX must respond to checkpoint and rollback requests.

Execution is blocked until either the server program returns success or an error occurs.

The GCOS application and the UNIX server must cooperate to accomplish a checkpoint and a subsequent rollback. UFAP does this for reading and writing files on UNIX. The application on GCOS cooperates by restarting at the appropriate point.

ETL-STATUS-RTN

ETL-STATUS-RTN is an output parameter used to determine the success of this procedure. When successful, this procedure sets ETL-PRIMARY-STATUS to zero. If an error occurs, ETL-PRIMARY-STATUS is set to a non-zero value. The ETL-IMMEDIATE and ETL-ORIGINAL fields identify the error.

ETL-FILE-ID

ETL-FILE-ID is an input parameter and refers to a connection previously established by a call to X_ETL_OPEN, or X_ETL_EXECUTE. If X_ETL_EXECUTE was used to establish the connection, ETL-RECORD-PREFIXES must have been specified as ETLADDPREFIX.

ETL-CHECKPOINT-ID

ETL-FILE-ID is an input parameter and refers to a connection previously established by a call to X_ETL_OPEN or X_ETL_EXECUTE.

ETL-CHECKPOINT-BLOCK

ETL-CHECKPOINT-BLOCK is an output parameter. It contains the ETL-CHECKPOINT-BLOCK that was supplied to X_ETL_CHECKPOINT when the checkpoint was taken.

Status codes returned from X_ETL_RESTART are:

Status Codes:

Status codes returned by X_ETL_RESTART include: REFER TO FIG. 59.

5.1.11 Define Records

CALL "X_ETL_DEFINEREC" USING ETL-STATUS-RTN,
ETL-FILE-ID,
ETL-PATHNAME.

This procedure assigns a record definition to the connection identified by ETL-FILE-ID. The record definition specifies the data conversions that subsequent X_ETL_READREC and X_ETL_WRITEREC procedures perform.

The specified GCOS file is read to obtain a record definition. The record definition conforms to that described in the RDBC Data Warehouse manuals available from Assignee. The textual record definition is parsed and used to define the conversions that read and write will use.

This procedure does not communicate with the UNIX server, and so always returns immediately. It causes subsequent procedures for the specified connection to behave differently.

ETL-STATUS-RTN

ETL-STATUS-RTN is an output parameter used to determine the success of this procedure. When successful, this procedure sets ETL-PRIMARY-STATUS to zero. If an error occurs, ETL-PRIMARY-STATUS is set to a non-zero value. The ETL-IMMEDIATE and ETL-ORIGINAL fields identify the error.

ETL-FILE-ID

ETL-FILE-ID is an input parameter and refers to a connection previously established by a call to X_ETL_OPEN, or X_ETL_EXECUTE.

ETL-PATHNAME

ETL-PATHNAME is an input parameter and specifies the GCOS file that contains the record definition to be read and parsed. If only the first two characters of ETL-PATHNAME are non-blank and if the first character is not a slash, '/', then the two-character name is treated as a file code referencing the GCOS file that contains the record definition to be read and parsed.

Status codes returned from X_ETL_DEFINEREC are:

Status Codes:

Status codes returned by X_ETL_DEFINEREC include: REFER TO FIG. 60.

Both the description of the format of ETL-PATHNAME and the list of status codes are incomplete. The processing of this function is mainly being performed by RDBC-related software that is distinct from the general ETL software. Further documentation is commercially available from Assignee of this invention.

5.1.12 Connection States and State Transitions

Tables 5.1.12.1 and 5.1.12.2 show the connection states and the state transitions that occur when ETL functions are executed.

Table 5.1.12.1 is for connections that are established by the X_ETL_OPEN function.

Table 5.1.12.2 is for connections that are established by the X_ETL_EXECUTE function.

Two general rules apply that are not explicitly shown in the tables.

Rule 1—When a major status of ETLUSERERR (value=1) is returned, no state transition occurs. The connection states at the start and end of the function are identical.

Rule 2—With the exception of the end-of-file status, the exception status codes are equivalent to successful status in terms of the state transitions that occur. Exception status codes have a primary status of ETLEXCEPTION (value=2) and a major status of ETLCOMPLETED (value=0).

The state transitions caused by the end-of-file status are explicitly shown in the three tables.

The conventions followed in Tables 5.1.12.1 and 5.1.12.2 are as follows:

1. Items in parentheses, ( ), represent input parameters to the called function.
2. Items in brackets, [ ], represent status values returned to the caller of the function. When no brackets are shown, successful status is implied.
3. The number in a table element identifies the state that the ETL connection enters at the completion of the call.
4. Table elements containing 'X' represent states in which the function is invalid.
5. Table elements containing '/' represent situations which cannot occur.
6. Table elements containing '=' represent situations where no state transition occurs; i.e., the state of the connection does not change as a result of the execution of the function.
7. 'eof' stands for the end-of-file status. The end-of-file status code is:
   ETL-PRIMARY-STATUS=ETLEXCEPTION (value=2)
   ETL-IMMD-MAJOR=ETLCOMPLETED (value=0)
   ETL-IMMD-MINOR=ETLEOF (value=1)
8. 'error' stands for any status other than successful.
9. 'fatal error' stands for any error with a major status of either ETLSVCERR (value=2) or ETLINTERR (value=3). REFER TO FIGS. 61A and 62B.

5.2 UNIX API

The stdin, stdout, and stderr files provide the UNIX interface for ETL. UNIX applications receive records from the GCOS application by reading stdin. UNIX applications send records to the GCOS application by writing to stdout and stderr. While ETL software passes data written to stdout to the GCOS application without change, ETL software attaches a prefix of '*ETL*E' to data written to stderr before passing it to the GCOS application.

If a GCOS application uses the X_ETL_CHECKPOINT and X_ETL_ROLLBACK functions, then the UNIX application must deal with prefixes on the records pertaining to those functions. The prefix characters shown in Table 5.2.1 are used. REFER TO FIG. 62.

The following rules apply to all records with a prefix:

The Checkpoint Request record that the UNIX application receives consists of the '*ETL*C' prefix followed by the data provided by the GCOS application in ETL-CKPT-DATA.

The Checkpoint Response record that the UNIX application sends in response to the checkpoint request record consists solely of the '*ETL*C' characters.

The Rollback Request record that the UNIX application receives consists solely of the '*ETL*R' characters.

The data that a UNIX application places after the '*ETL*R' prefix of the rollback response record is passed to the GCOS application in ETL-CKPT-DATA.

5.3 UNIX Internal Interface

This section specifies an internal interface for the UNIX portion of the Fast-ETL product. This interface is the interface to UFIP that is used by UFAP and UEXEC.

5.3.1 Include File

The include file 'ETLUxInterface.h' contains the prototypes for the functions specified here and the following constants:

| Parameters | | |
|---|---|---|
| ETLWRITE | A | Records will be sent by the GCOS client |
| ETLREAD | B | Records will be received by the GCOS client |
| ETLASCII | C | Records are exchanged in ASCII mode. |
| ETLRAW | D | Records are exchanged in 8 out of 9 mode. |
| ETLBITS | E | Records are exchanged in binary mode. |
| ETLMQUE | F | Configure a UNIX message queue |
| ETLSDFLT | G | Configure the default port |

-continued

| | | |
|---|---|---|
| ETLSREQP | H | Configure the specified port |
| ETLSSRCH | I | Search for an available port |
| ETLSSOCK | J | Use an already connected socket |
| Error Codes | | |
| ETLTooMany | −A | Too many connections are in use. |
| ETLUnknownID | −B | Invalid Connection ID. |
| ETLNoPortsAvail | −C | No ports available. |
| ETLPortNotAvail | −D | The specified port is not available. |
| ETLEndOfFile | −E | All records have been sent. |
| ETLUnexpClose | −F | Unexpected call to ETLClose. |
| ETLDisconnect | −G | The client has disconnected. |
| ETLNotAllowed | −H | Operation is not allowed for this connection. |
| ETLSockErr | −I | Error from socket routine. |
| ETLTooLarge | −J | Record is too large. |
| ETLTimeout | −K | Specified time has expired. |
| ETLNoInterrupt | −L | No interrupt is present. |
| ETLPathTooLong | −M | path name from the GCOS client is too long for the buffer |
| ETLInfoTooLong | −N | the open file info from the GCOS client is too large for the buffer. |

Constants "A" through "N" are arbitrary constants assigned by the implementers. The standard "C" convention of utilizing negative numbers as error codes is utilized here, but is not required to practice this invention.

5.3.2 ETLInitConnection
   int ETLInitConnection (int connMode,
   int portID,
   int flags,
   int *returnedPortNo)

This function obtains a connection ID for subsequent use by a call to 'ETLAcceptOpen'. A UNIX message queue or a socket can be specified.

'connMode' can be one of the following:
   ETLMQUE configure a UNIX message queue
   ETLSDFLT configure the default port
   ETLSREQP configure the specified port
   ETLSSRCH search for an available port
   ETLSSOCK use an already connected socket When successful, a positive connection ID is returned, and if the sockets interface was requested, the port number configured is stored in 'returnedPortNo' (except for ETLSSOCK mode). The connection ID is used in subsequent calls, including ETLAcceptOpen.

This function does not block. When an error occurs, a negative error code is returned:
   ETL TooMany Too many connections are in use.
   ETLNoPortsAvail No ports available.
   ETLSockErr Error from socket routine.

5.3.3 ETLAcceptOpen
int ETLAcceptOpen (int connectionID, int maxTime);

This function listens on the port established for the specified connection by a previous call to 'ETLGetPort' or 'ETLSetPort'. The function blocks until a connection is established from a client program, or until the specified time has passed. The 'maxTime' parameter is the maximum number of milliseconds to wait. A value of zero specifies no timeout, i.e. the function will return immediately unless an open request has already been received from the client.

When successful, this function returns zero.

When an error occurs, a negative error code will be returned:

| | |
|---|---|
| ETLInvalidID | Invalid Connection ID. |
| ETLDisconnect | The client has disconnected. |
| ETLSockErr | Error from socket routine. |
| ETLTimeout | Specified time has expired. |
| ETLPathTooLong | path name from the GCOS client is too long for the buffer |
| ETLInfoTooLong | the open file info from the GCOS client is too large for the buffer. |

5.3.4 ETLReadRecord
   int ETLReadRecord (int connectionID,
   int maxTime,
   char buffer[ ],
   int bufferSize,
   int *retRecType);

This function returns the next record sent by the client. If one is not available, it blocks until a record is sent by the client, or until the 'maxTime' has expired (in milliseconds). A value of zero specifies no timeout, i.e. the function will return immediately unless a record has already been received from the client. The maximum number of bytes that can be received is specified by the 'bufferSize' parameter.

If the buffer supplied is too small to contain the record sent, 'ETLTooLarge' will be returned, the first 'bufferSize' bytes of the record will be put into 'buffer' and the remainder is discarded. The next call to this function will return the next record; i.e. there is no mechanism to obtain the truncated portion of a record.

Each byte put into the 'buffer' parameter will contain the least significant 8 bits of each byte sent from GCOS. In other words, the most significant bit of each GCOS byte is thrown away when obtained by this function. Data is put into the buffer in the same order as it exists in GCOS memory.

When successful, this function returns the number of bytes in the record received. A return value of zero means that the client sent a zero-length record. This function returns ETLEndOfFile only after all of the records sent by the client have been read. The integer pointed to by 'retRecType' is set to the record type retrieved when successful.

When an error occurs, a negative error code will be returned:

| | |
|---|---|
| ETLInvalidID | Invalid Connection ID. |
| ETLDisconnect | The client has disconnected. |
| ETLNotAllowed | This operation is not allowed for this connection. |
| ETLSockErr | Error from socket routine |
| ETLTooLarge | Record is too large. |
| ETLEndOfFile | All records have been sent. |
| ETLTimeout | Specified time has expired. |

5.3.5 ETLWriteRecord
   int ETLWriteRecord (int connectionID,
   char buffer[ ],
   int writeSize,
   int recType);

This function sends a record to the GCOS client. It will not normally block, but the socket routines that it uses may cause delays. The number of bytes sent is specified by the 'writeSize' parameter. A 'writeSize' of zero is valid, and will cause the client to receive a zero length record.

Each byte sent from the 'buffer' parameter will be put into the least significant 8 bits of each byte in GCOS memory.

The most significant bit of each GCOS byte is will be set to zero. Data is put into GCOS memory in the same order as it exists in the 'buffer' parameter. The 'recType' parameter specifies the record type to send.

When successful, this function returns zero. When 'ETLUnexpClose' is returned, this means the client has called 'ETLClose' before receiving all the records. When an error occurs, a negative error code will be returned:

| | |
|---|---|
| ETLInvalidID | Invalid Connection ID. |
| ETLDisconnect | The client has disconnected. |
| ETLNotAllowed | This operation is not allowed for this connection. |
| ETLSockErr | Error from socket routine |
| ETLTooLarge | Record is too large. |
| ETLUnexpClose | Unexpected call to ETLClose. |

5.3.6 ETLClose int ETLClose (int connectionID, int maxTime, char *errorMesg);

This function closes the file begun with the 'ETLAcceptOpen' function. This function will not return until the client program executes a corresponding close function, or until the specified 'maxTime' (in milliseconds) has expired. A value of zero specifies no timeout, i.e. the function will return immediately unless a close has already been sent by the GCOS client If this connection is sending ('ETLAcceptOpen' returned 'ETLREAD' for the 'returnedOpenAction' parameter), any partial buffers will be flushed and sent. An end of file indication will be sent to the client.

If this connection is receiving ('ETLAcceptOpen' returned 'ETLWRITE' for the 'returnedOpenAction' parameter), any records sent by the client, but not received by calls to 'ETLReadFile' will be discarded.

If 'errorMesg' is non-NULL, the client will receive a status of ETLCONNERR, and the text in 'errorMesg' will be supplied to the client. When successful, this function returns zero. When an error occurs, a negative error code will be returned:

| | |
|---|---|
| ETLInvalidID | Invalid Connection ID. |
| ETLDisconnect | The client has disconnected. |
| ETLSockErr | Error from socket routine |
| ETLTimeout | Specified time has expired. |
| ETLUnexpClose | Unexpected call to ETLClose. |

Note:

Normally, the sending node (the node issuing writes) will call close after all the records to be sent have been written. This will cause the receiving node to get an end-of-file status after all the records have been read. The receiving node then calls close to notify the sending node that all of the records have been successfully received. The close functions in both nodes then receive a zero status.

If the receiving node calls close before a close has been received from the sending node, the data will potentially be truncated. The close functions in both nodes will receive an 'ETLUnexpClose' status in this case. The receiving node can use this mechanism to prematurely end a transfer.

6 SID Interface 6.1 Send Message Interface

GFIP calls SID's Send Message function to send a block of data to a DBSP that provides the Fast-ETL service. The Send Message interface is similar to the interface to SID's Pass Messages function, which is the function originally defined for exchanging data with a DBSP. The interfaces differ primarily in that the Send Message interface does not provide for an input buffer parameter. The Send Message call is shown below.

Calling Sequence
    ICLIMB 'S$DBSP_APP_SVC',4

Input Parameters (Via Parameter Stack)
    .PS+0=V Block
    .PS+1=R Block
    .PS+2=Surrogate Client ID
    .PS+3=Output Buffer 6.1.1 V Block Parameter Refer to FIG. 63.

Version Number

The version number for the Send Message function has a value of 19980901.

Function Code

The function code for the Send Message function has a value of two.

Output Buffer Size

Output Buffer Size specifies the size in words of the buffer that contains the message that is to be sent to the DBSP. The valid range for Output Buffer Size is 0 to 8128 (SID's buffer size of 8192 minus 64 words that are reserved for SID's control headers) inclusive.

Maximum Delay Time

Maximum Delay Time specifies the maximum amount of time that the caller is willing to be delayed while SID waits for a DBSP message. In general, the Send Message function does not need to wait for DBSP messages. The exceptions to this rule are:
1. Send Message waits after sending the initial message starting a DBSP application. SID waits for a DBSP Link Message that confirms that the requested application is recognized by IO-MAN software on the DBSS.
2. Send Message waits when it finds that it no longer has the right to send more data to the DBSS. The DBSS authorizes SID to send more data by sending a DBSP Credit Message.

The Maximum Delay Time is an unsigned binary number that is in units of tenths of a millisecond. Values less than 50 are treated as if they are equal to 50. Times greater than 24 hours mean wait forever.

6.1.2 R Block Parameter

When SID detects an error condition, it returns to its caller with index register 0 (X0) set to minus 1. When SID produces the error status values of 1/002 (invalid number of parameters), 1/004 (invalid R Block size) and 1/008 (invalid R Block descriptor), it stores nothing in the R Block. Otherwise, SID stores information about the error condition in the R block, which has the following format. REFER TO FIG. 64.

FCGI

This field contains the Functional Code Group Identifier. It is a 1 to 4 character ASCII string that identifies the component returning the status. All error statuses that originate from SID will have an FCGI value of 'AFSA'.

Sub-Function
This field is a 18-bit number that contains a code that identifies a sub-component within the functional group. SID stores an appropriate value in the field.

Major Status
This field contains a 9-bit number that identifies the major category of the returned error status. A zero value indicates a successful completion of the requested service. A non-zero value indicates an error condition has occurred while attempting to provide the service. SID's major status categories are defined in the SID LLD [4].

Minor Status
This field, by convention, contains the secondary status. It is a 9-bit number that further classifies the error status. A non-zero value indicates that additional status information is present. It is used in conjunction with the major status to isolate the reason for the error. SID's minor statuses are defined in the SID LLD [4].

SID does not place any data in the following three fields. However, SID does expect its caller's R-block to be 86 words in size; i.e., the R-Block buffer must be large enough to contain these fields.

Error Message Line Length
This field contains a number specifying the length in bytes of each error message line contained within the Error Message Area. All lines are the same length; they are left-justified and blank-filled.

Number of Error Message Lines
This field contains a number specifying the count of error message lines contained within the Error Message Area. The field may contain the values 0 through 4 inclusive.

Error Message Area
This field contains an error message consisting of up to four lines. Each line is an ASCII string which does not contain slew control (e.g., carriage-return and line-feed characters). The callers of SID are responsible for placing the required slew control characters at the end of each line. SID constructs an error message and stores the message in this field when a non-zero value is returned in the major status field.

6.1.3 Surrogate Client ID Parameter Refer to FIG. 65.
DBSS Name
This field identifies the DBSS server. It is a 1 to 12 character ASCII name, left-justified and blank-filled.
Application Name
IO-MAN uses the Application Name to determine the DBSP directory that contains the executable program for the surrogate client. Application Name is a 1 to 32 character ASCII name, left-justified and blank-filled.
Executable Name
The field identifies the file containing the executable program for the surrogate client. It is a 1 to 32 character ASCII name, left-justified and blank-filled.
Commitment Mode
The field specifies the level of commitment coordination required by the application. Only one value is valid. REFER TO FIG. 66.
Command Name
The Command Name field contains the name of the command associated with a TP8 transaction. This field contains a 1 to 8 character ASCII name, left-justified and blank-filled. It is set to spaces if the commitment unit is not associated with a TP8 transaction.

HA Preference
The field specifies the high-availability platform to which the application is to be assigned. The valid values for this field are as follows. REFER TO FIG. 67.
File ID
This field uniquely identifies the stream. The initial implementation supports only one stream and does not make use of this field. It is defined for future extensibility.

6.1.4 Output Buffer Parameter

This parameter locates the buffer containing the data to be sent to the DBSP.

6.2 Receive Message Interface

GFIP calls SID's Receive Message function to obtain a block of data from a DBSP that provides the Fast-ETL service. The Receive Message call is shown below.

Calling Sequence
  ICLIMB 'S$DBSP_APP_SVC',5

Input Parameters (Via Parameter Stack)
  .PS+0=V Block
  .PS+1=R Block
  .PS+2=Surrogate Client ID
  .PS+3=Null
  .PS+4=Input Buffer 6.2.1 V Block Parameter Refer to FIG. 68.

Version Number

The version number for the Receive Message function has a value of 19980901.

Function Code

The function code for the Receive Message function has a value of three.

Input Buffer Size

Input Buffer Size specifies the size in words of the buffer where SID places the message from the DBSP. The valid range for Input Buffer Size is 0 to 8128 inclusive.

Maximum Delay Time
  Maximum Delay Time specifies the maximum amount of time that the caller is willing to be delayed while SID waits for a DBSP message. The Maximum Delay Time is an unsigned binary number that is in units of tenths of a millisecond. Values less than 50 are treated as if they are equal to 50. Times greater than 24 hours mean wait forever.

6.2.2 R Block Parameter
  The R Block Parameter for the Receive Message function is identical to that of the Send Message function, described above.

6.2.3 Surrogate Client ID Parameter
  The Surrogate Client ID Parameter for the Receive Message function is identical to that of the Send Message function; described above.

6.2.4 Input Buffer Parameter
  This parameter locates the buffer where SID places the message from the DBSP.

7 Example USAGE
  The following examples use a pseudo-code notation, to show how a Cobol 85 application would use the GCOS API. Many of the details are omitted, but would be obvious to a person reasonably skilled in this area.

7.1 UNIX Command Needs No Input, Ignore Output
   ETLexecute using "mkdir/home/dbsp/ . . . "
   ETLterminate maxTime=30 sec.—closes stdin, stdout; cleans up ETL on both sides 7.2 UNIX Command Needs No Input; Display Output
   ETLexecute using "ls-al/home/dbsp/ . . . " while (not eof)
   ETLread—read stdout until eof—eof means command has finished
   Cobol display
   ETLterminate maxTime=0—closes stdin, stdout; cleans up ETL on both sides 7.3 UNIX Command Needs Input, Ignore Output
   ETLexecute using "sort>otfile" while (not eof)
   Cobol read
   ETLwrite
   ETLterminate maxTime=30 sec.—closes stdin, stdout; cleans up ETL on both sides 7.4 UNIX Command Needs Input, Display Output
   ETLexecute using "sort" while (not eof)
   Cobol read
      ETLwrite
   ETLClose—close stdin while (not eof)
   ETLread—read stdout until eof—eof means command has finished
   Cobol display
   ETLterminate maxTime=0—closes stdout; cleans up ETL on both sides 7.5 Bulk Load, Separate File
   ETLopen "/home/dbsp/input" while (not eof)
   Cobol read
   ETLwrite
   ETLclose
   ETLexecute using "fastload . . . " while (not eof)
   Cobol read of fastload directives
   ETLwrite
   ETLClose—close stdin while (not eof)
   ETLread—read stdout until eof—eof means command has finished
   Cobol display
   ETLterminate maxTime=0—closes stdout; cleans up ETL on both sides 7.6 Interactive Command
   ETLexecute using "ftp . . . "
   ETLwrite "mode binary"
   ETLread . . . —get prompt
   ETLwrite "send<file-name>"
   ETLread . . . —get prompt
   ETLwrite "quit"
   ETLTerminate maxTime=0

Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

The invention claimed is:

1. A method of providing a checkpoint/restart facility in conjunction with reading and writing data files across a plurality of computer systems, wherein:
the plurality of computer systems comprises:
   a first computer system executing a first program, and
   a second computer system containing a disk system and executing a second program;
the first computer system and the second computer system are heterogeneous computer systems;
said method comprising:
A) checkpointing a current status of the first program resulting in a first set of checkpoint status information;
B) transmitting a first checkpoint request that includes the first set of checkpoint status information from the first program over a first session to the second program;
C) checkpointing the second program resulting in a second set of checkpoint status information in response to receiving the first checkpoint request;
D) writing the first set of checkpoint status information and the second set of checkpoint status information to a first checkpoint file on the disk system;
E) transmitting a first checkpoint response from the second program over the first session to the first program after the writing in step (D) is complete;
F) checkpointing the first program resulting in a third set of checkpoint status information;
G) transmitting a second checkpoint request that includes the third set of checkpoint status information from the first program over the first session to the second program;
H) checkpointing the second program resulting in a fourth set of checkpoint status information in response to receiving the first checkpoint request transmitted in step (G);
I) writing the third set of checkpoint status information and the fourth set of checkpoint status information to a second checkpoint file on the disk system;
J) transmitting a second checkpoint response from the second program over the first session to the first program after the writing in step (I) is complete;
K) transmitting a first rollback request from the first program over the first session to the second program;
L) reading the third set of checkpoint status information and the fourth set of checkpoint status information from the second checkpoint file in response to receiving the first rollback request transmitted in step (K);
M) rolling back the second program utilizing the fourth set of checkpoint status information read in step (L);
N) transmitting a first rollback response from the second program over the first session to the first program that includes the third set of checkpoint status information read in step (L); and
O) rolling back the first program utilizing the third set of checkpoint status information in response to receiving the first rollback response in step (N).

2. The method in claim 1 wherein:
the first checkpoint file and the second checkpoint file are a same file.

3. The method in claim 1 which further comprises:
P) transmitting a third checkpoint request that includes the first set of checkpoint status information from the first program over a second session to a third program executing in a third computer system;
Q) checkpointing the third program resulting in a fifth set of checkpoint status information in response to receiving the third checkpoint request;
R) writing the first set of checkpoint status information and the fifth set of checkpoint status information to a third checkpoint file; and S) transmitting a third checkpoint response from the third program over the second session to the first program after the writing in step (R) is complete.

4. The method in claim 1 wherein:

there are plurality of sessions open between the first program and the second program for accessing a corresponding plurality of files by the second program; and the checkpointing in step (C) flushes all of the plurality of files and includes checkpoint information for all of the plurality of files in the second set of checkpoint information.

* * * * *